(12) United States Patent
Tschantz

(10) Patent No.: US 9,533,251 B2
(45) Date of Patent: Jan. 3, 2017

(54) CONTROL OF VAPOR EMISSIONS FROM GASOLINE STATIONS

(75) Inventor: Michael F. Tschantz, Lexington, VA (US)

(73) Assignee: Ingevity South Carolina, LLC, North Charleston, SC (US)

( * ) Notice: Subject to any disclaimer, the term of this patent is extended or adjusted under 35 U.S.C. 154(b) by 1568 days.

(21) Appl. No.: 12/282,410

(22) PCT Filed: Apr. 3, 2007

(86) PCT No.: PCT/US2007/065856
§ 371 (c)(1),
(2), (4) Date: Sep. 10, 2008

(87) PCT Pub. No.: WO2007/121085
PCT Pub. Date: Oct. 25, 2007

(65) Prior Publication Data
US 2009/0056827 A1    Mar. 5, 2009

Related U.S. Application Data

(60) Provisional application No. 60/744,543, filed on Apr. 10, 2006, provisional application No. 60/744,615, (Continued)

(51) Int. Cl.
| | | |
|---|---|---|
| B65B 31/00 | (2006.01) |
| B65B 31/04 | (2006.01) |
| B65B 1/20 | (2006.01) |
| B65B 1/28 | (2006.01) |
| B65B 3/18 | (2006.01) |
| B65B 3/22 | (2006.01) |

(Continued)

(52) U.S. Cl.
CPC ....... *B01D 53/0415* (2013.01); *B01D 53/0454* (2013.01); *B01D 2253/102* (2013.01); *B01D 2253/104* (2013.01); *B01D 2253/108* (2013.01); *B01D 2253/3425* (2013.01); *B01D 2257/702* (2013.01); *B01D 2259/40081* (2013.01); *B01D 2259/40086* (2013.01); *B01D 2259/4516* (2013.01)

(58) Field of Classification Search
CPC ............ B01D 53/0415; B01D 53/0454; B01D 2253/102; B01D 2259/4516; B01D 2253/3425; B01D 2257/702; B01D 2259/40081; B01D 2259/108; B67D 7/54
USPC ... 141/45, 82, 59, 65, 66, 285, 286; 96/108; 210/263, 502.1
See application file for complete search history.

(56) References Cited

U.S. PATENT DOCUMENTS 3,106,071 A  * 10/1963  Green et al. .................... 62/50.1
3,756,291 A  *  9/1973  McGahey et al. .............. 141/45
(Continued)

*Primary Examiner* — Arthur O Hall
*Assistant Examiner* — Steven M Cernoch
(74) *Attorney, Agent, or Firm* — Bryan D. Zerhusen; Locke Lord LLP

(57) ABSTRACT

The present invention relates to a vapor recovery system for gas station that is capable of controlling vapor emission to less than 0.38 lbs/1000 gallons fuel dispensed. The system may include at least one canister containing adsorbents such as activated carbon, zeolite, activated alumina, silica, and other adsorbents for passive removal of hydrocarbon vapors in venting air. Additionally, the system may include a means to enhance vapor-liquid equilibrium in the ullage of the fuel tank and accordingly minimize vapor emission level.

17 Claims, 15 Drawing Sheets

Related U.S. Application Data filed on Apr. 11, 2006, provisional application No. 60/862,536, filed on Oct. 23, 2006.

(51) Int. Cl.
   *B65B 1/04* (2006.01)
   *B65B 3/04* (2006.01)
   *B01D 53/04* (2006.01)

(56) References Cited

U.S. PATENT DOCUMENTS

| | | | |
|---|---|---|---|
| 3,881,894 A | 5/1975 | Onufer | |
| 3,903,708 A * | 9/1975 | Mair | 62/48.2 |
| 3,907,010 A * | 9/1975 | Burtis et al. | 141/45 |
| 4,166,485 A * | 9/1979 | Wokas | 141/52 |
| 4,223,803 A * | 9/1980 | Pearson | 222/3 |
| RE31,093 E | 11/1982 | Tolles et al. | |
| 4,671,071 A * | 6/1987 | Sasaki | 62/47.1 |
| 4,769,359 A | 9/1988 | Audley et al. | |
| 4,830,576 A * | 5/1989 | Patrick | 417/45 |
| 4,886,096 A * | 12/1989 | Reddy | 141/45 |
| 5,305,807 A | 4/1994 | Healy | |
| 5,538,929 A | 7/1996 | Sudhakar et al. | |
| 5,819,796 A * | 10/1998 | Kunimitsu et al. | 137/587 |
| 5,913,343 A * | 6/1999 | Andersson | 141/59 |
| 5,944,067 A * | 8/1999 | Andersson | 141/59 |
| 6,047,687 A * | 4/2000 | Ishikawa et al. | 123/518 |
| 6,478,849 B1 | 11/2002 | Taylor et al. | |
| 6,540,815 B1 | 4/2003 | Hiltzik et al. | |
| 6,763,856 B2 | 7/2004 | Healy | |
| 6,854,492 B2 * | 2/2005 | Benjey | 141/198 |
| 6,929,038 B2 * | 8/2005 | Nanaji | 141/67 |
| RE38,844 E | 10/2005 | Hiltzik et al. | |
| 7,000,651 B2 * | 2/2006 | Fink et al. | 141/82 |
| 7,014,693 B2 * | 3/2006 | Kishkovich et al. | 96/413 |
| 7,185,682 B2 * | 3/2007 | Riegel et al. | 141/97 |
| 2004/0103952 A1 * | 6/2004 | Benjey | 141/59 |
| 2005/0061301 A1 | 3/2005 | Meiller et al. | |
| 2005/0123763 A1 * | 6/2005 | Hiltzik et al. | 428/407 |
| 2005/0145294 A1 * | 7/2005 | Fink et al. | 141/82 |
| 2005/0241479 A1 * | 11/2005 | Lebowitz et al. | 95/146 |
| 2005/0241480 A1 * | 11/2005 | Lebowitz et al. | 95/146 |
| 2005/0266750 A1 * | 12/2005 | Li | 442/59 |
| 2006/0075895 A1 * | 4/2006 | Shimada et al. | 95/233 |
| 2006/0205830 A1 * | 9/2006 | Lebowitz et al. | 521/125 |
| 2007/0125235 A1 * | 6/2007 | Begley et al. | 96/147 |

* cited by examiner

CONTROL OF VAPOR EMISSIONS FROM GASOLINE STATIONS

This non-provisional application relies on the filing date of provisional U.S. Application Ser. Nos. 60/744,543 filed on Apr. 10, 2006; 60/744,615 filed on Apr. 11, 2006; and 60/862,536 filed on Oct. 23, 2006, which are incorporated herein by reference, having been filed within twelve (12) months thereof, and priority thereto is claimed under 35 USC §1.19(e).

BACKGROUND OF THE INVENTION

Activated carbon has been used for removal of impurities and recovery of useful substances from liquids and gases because of its high adsorptive capacity. Generally, "activation" refers to any of the various processes by which the pore structure is enhanced. Typical commercial activated carbon products exhibit a surface area (as measured by nitrogen adsorption as used in the B.E.T. model) of at least 300 $m^2/g$. Common carbon sources include as resin wastes, coal, coal coke, petroleum coke, lignite, polymeric materials, and lignocellulosic materials including pulp and paper, residues from pulp production, wood, nut shell, kernel, fruit pit, petroleum, carbohydrates, and bone. Typical activation processes involve treatment of carbon sources either thermally with an oxidizing gas or chemically often with phosphoric acid or metal salts such as zinc chloride. U.S. patent No. RE 31,093 teaches a chemical activation of wood-based carbon with phosphoric acid to improve the carbon's decolorizing and gas adsorbing abilities. U.S. Pat. No. 4,769,359 teaches a method of producing activated carbon by treating coal cokes and chars, brown coals or lignite with a mixture of NaOH and KOH and heating to at least 500° C. in and inert atmosphere.

The activated carbon could be in the form of granules, spheres, monoliths, beads, powders or fibers.

California has adopted Enhanced Vapor Recovery (EVR) regulations for the systems installed at gasoline dispensing facilities for controlling gasoline vapors emitted during the fueling of storage tanks (Phase I) and the refueling of vehicle fuel tanks (Phase II). The gasoline distribution facilities (herein "gas stations") must comply with such adapted regulation by April 2009.

To comply with the new regulatory, about 80% of California gas stations have balanced EVR systems, and about 20% uses vacuum assisted systems. Balanced systems are inherently compatible with on-board refueling vapor recovery (ORVR) equipped vehicles and are generally less expensive than vacuum assisted systems; therefore, they are the major emission control systems adopted by the gas stations.

Vapor recovery systems include all associated dispensers, piping, nozzles, couplers, processing unit (also known as "processor"), underground storage tanks, and any other equipment or components necessary for the control of gasoline vapors during Phase I or Phase II refueling operations at the gas stations. The equipment used to control hydrocarbon emissions from gas station storage tanks is typically known as a storage tank vent "processor." Methods that may be considered for controlling such hydrocarbon emissions include oxidizing the emitted hydrocarbons to carbon dioxide and water, or capturing the emitted hydrocarbons and returning them to the storage tank via a vapor recovery system.

FIG. 1 shows a simplified gas station fuel dispensing system equipped with a balanced vapor recovery system. It includes at least one storage tank 100, typically an underground storage tank or also known as "UST", containing liquid fuel 110 and a vapor space 115 above the liquid fuel level that its volume is commonly referred to as "ullage." The gas station may have one or more fuel dispensing units 201 and 202, typically known as "gas pumps". In FIG. 1, a submersible pump 120 is shown on top of tank 100, although it may be located elsewhere. The submersible pump 120 may be a turbine pump or other types of pump known in the art. As is typical with pumping systems, submersible pump 120 may draw liquid 110 up from within tank 100, through an intake device 125 such as a filter or screen, through a pickup line 122, into submersible pump 120, and then out of the pump through pump outlet line 130 which feeds the fuel dispensing units 201, 202. For gas stations equipped with a balanced vapor recovery system, an air/vapor return line 140 is provided between fuel dispensing units 201, 202 and back to tank 100.

The pressure in tank 100 may vary; therefore, typically a pressure valve (PV) 150 is provided to regulate the tank pressure to values near atmospheric, for example not allowing the tank pressure to depart from atmospheric pressure by more than a few inches water column (w.c). Furthermore, the pressure valve 150 may maintain the tank pressure between an upper (typically slight positive) pressure and a lower (typically slight negative or vacuum) pressure. The pressure valve 150 may comprise one or more physical valves, with one or more piping lines, pressure measuring or detecting devices, control devices, etc. Moreover, several underground storage tanks 100 may be manifolded together to utilize a common pressure valve 150. A vent device 160 may be provided, which may comprise a cover to keep out rain and a flame arrestor for safety. Balanced systems function by operating as a closed system between pressures of about 1.5-3 inches w.c. down to negative pressures (e.g., vacuum) of 3-10 inches w.c.

FIG. 2 depicts a situation when fuel is pumped out of the underground storage tank 100 to a non-ORVR (onboard refueling vapor recovery) vehicle 301. In this example, a metered amount of gasoline from fuel dispensing unit 201 travels though dispensing hose 230 to nozzle 211, and from there into the gas tank of non-ORVR vehicle 301. Simultaneously, an approximately equal volume of air/gasoline vapor is returned through dispenser air/vapor return line 240 back to the fuel dispensing unit 201 and from there through dispenser air/vapor return line 140 to the storage tank 100. Much of this air/gasoline vapor is from within the gas tank of vehicle 301, from which it is displaced by the incoming gasoline. The dispensing hose 230 and dispenser air/vapor return line 240 may be a pair of hoses or a coaxial hose.

In FIG. 2, the approximately equal exchange of fuel from tank 100 to vehicle 301 and air/vapor return from vehicle 301 back to tank 100, results in little pressure change in storage tank 100.

FIG. 3 depicts a situation when fuel is pumped out of the storage tank 100 to an ORVR vehicle 302. The operation is similar to that described above, except that in an ORVR vehicle 302 most of the air/vapor displaced from the vehicle tank by the incoming fuel is vented through the vehicle's own emission control system, the gasoline vapors are adsorbed by the vehicle's activated carbon canister, and the purified air vents to the atmosphere. As denoted by 241, little air/vapor flows back through dispenser air/vapor return line 240, and only a reduced volume of air (and largely devoid of hydrocarbons) is returned to the storage tank 100. The reduced volume of air may be only about 10% of the liquid fuel flow that went into vehicle 302. A net pressure within the storage tank 100 reduces, thereby inducing a flow 161 of makeup air devoid of hydrocarbons (in an amount about 90% of the liquid flow) in through vent device 160 and through the vacuum relief function of pressure valve 150.

In this description, the pressure valve (PV) 150 is used to describe a valve or valves operable under certain conditions to prevent the storage tank 100 from experiencing either an over pressure situation or an under pressure (excessive vacuum) situation. Typically such a system of valves allows air or air/vapors to move in and out of the storage tank 100 under controlled pressure conditions.

Due to the fluid flows as described here, while the gas station is open for business and actively filling a proportion of ORVR-equipped vehicles with gasoline, the net pressure within the storage tank 100 remains under a slight vacuum. After a number of ORVR-equipped vehicles 302 have been filled, the storage tank 100 vacuum may drop low enough for the vacuum relief function of PV valve 150 to open and allow fresh air 161 to enter the storage tank 100 to make up for the dispensed liquid fuel. The makeup air 161 is devoid of hydrocarbons and dilutes the air in the tank ullage 115, thereby reducing the hydrocarbon concentration in the vapor phase. To restore equilibrium, the vapor pressure of the gasoline causes it to partition from the liquid fuel volume 110 to the ullage 115 vapor phase, resulting in a volume/pressure increase within the storage tank 100. While the gas station is open and actively fueling vehicles, the net result is such that the storage tank 100 pressure remains negative and the concentration of gasoline vapors in the tank ullage 115 remains below saturation (for example at about 85%-98% of saturation).

FIG. 4 depicts the situation during periods when the station refueling is inactivity, for example during slow business hours or at night. The partitioning of gasoline from the liquid 110 to the vapor phase 115 to reach a state of vapor-liquid equilibrium (VLE) can cause the storage tank pressure to increase to a level that exceeds the upper pressure limit of pressure valve(s) PV 150, which causes the valve to open and allow air/gasoline vapor 165 to vent to the open atmosphere. The new California Phase II regulations require that the 30-day-average pressure within a tank must not exceed 0.25 inches w.c. (in calculating this average, negative pressures are treated as a value of zero gauge pressure), and the daily pressure cannot exceed 1.5 inches w.c. One purpose of this pressure requirement is to minimize fugitive emissions that can leak from a storage tank and associated equipment. Additionally, vapor emissions may not exceed 0.38 lbs/1000 gallons of fuel dispensed, which implies a total vapor recovery rate of better than 95%.

The balanced EVR systems relies on a relatively "high" vacuum (down to about −8 inches w.c.) to minimize vapor venting emissions. The pressure valve required for regulating the vacuum or pressure within the tank renders the system troublesome. It must be certified and demand regular maintenance or replacement.

U.S. Pat. No. 5,305,807 discloses an auxiliary vapor recovery device for use with a fuel dispenser that includes a vacuum pump and a canister containing adsorbent for removal of hydrocarbons from a vapor/air mixture. The vacuum pump draws air/vapor from the ullage of storage tanks through the canister for removal of hydrocarbon vapor and release of air. Additionally, the vacuum pump draws desorbed gasoline vapors from the spent adsorbent canister. U.S. Pat. No. 6,478,849 teaches a vapor recovery system for fuel storage tank that includes a pair of adsorbent canisters for alternative recovering volatile organic compounds (VOC) from the fuel tank ullage. While one canister adsorbs VOC, the other canister is regenerated by exhausting the VOC vapors from the VOC canisters back into the fuel tank ullage using a vacuum pump. These aforementioned vapor recovery systems require vacuum pump to actively draw vapor/air in the ullage of the fuel tank and desorb the VOC to regenerate the spent adsorbent. The requirement of vacuum pump in such vapor recovery systems consumes additional energy for operation and increases burden in maintenance.

U.S. Pat. No. 6,763,856 teaches a method for controlling pressure in the ullage space of an underground storage tank of volatile liquid fuel. The vapor/air in the ullage is treated or conditioned inside a gaseous flow conditioning apparatus to increase the fuel vapor concentration of the gaseous flow toward saturation, and then released into the fuel tank. The gaseous flow conditioning apparatus may contain at least one chamber where the gaseous flow is passed through a liquid fuel mist chamber or a close proximity of a fuel-wetted mesh. Additionally, the gaseous flow conditioning apparatus may comprise a chamber in which the gaseous flow is entrained into a stream of liquid fuel, and then delivered into a volume of liquid fuel inside the fuel tank. This method of controlling vapor emission requires a separate gaseous flow conditioning apparatus that conditions the gaseous flow in a manner to enhance vapor-liquid equilibrium prior to delivering the gaseous flow into the fuel tank, either to the ullage portion or liquid-filled portion of the fuel tank. The separate gaseous flow conditioning apparatus requires additional capital and installation cost.

Accordingly, there is a need for vapor recovery systems that do not require the use of vacuum pump, or other forced air/vapor system, thereby allowing the systems to control the vapor emission passively, yet effectively at lower energy consumption and maintenance cost.

Furthermore, there is a demand for vapor recovery systems that do not require additional gaseous flow conditioning apparatus in order to reduce capital, operation, and maintenance costs.

It is, therefore, an object of the present to provide for vapor recovery systems that effectively control the vapor emission from the gas station, yet do not require a vacuum pump to actively draw vapor/air from the ullage space and/or a separate gaseous flow conditioning apparatus, thereby rendering the ease of operating and maintaining the systems, as well as lowering the energy and cost for operating such systems.

It is another object of the present invention to provide vapor recovery systems that meet the new California regulations for vapor emission of less than 0.38 lbs/1000 gallons fuel dispensed yet without pressure relieve valve in order to simplify system operation and maintenance, as well as to maintain a UST pressure near ambient and ensure regulatory pressure profile compliance of less than 0.25 inches w.c.

It is yet another object of the present invention to provide vapor recovery systems having means to enhance the gasoline VLE equilibrium in the tank ullage, thereby minimizing vapor growth and potential venting of air and hydrocarbons to the atmosphere.

It is a further object of the present invention to provide canisters containing regenerable adsorbents that are capable of controlling the vapor emission level to below 0.38 lbs/1000 gallons fuel dispensed (i.e, greater than 95% control efficiency).

Other objects, features and advantages of the present invention will be set forth in part in the description which follows, and in part will be obvious from the description or may be learned by practice of the invention.

SUMMARY OF THE INVENTION

The present invention relates to a vapor recovery system for gas station that is capable of controlling vapor emission to less than 0.38 lbs/1000 gallons fuel dispensed. The system may include at least one canister containing adsorbents such as activated carbon, zeolite, activated alumina, silica, and other adsorbents for passive removal of hydrocarbon vapors in venting air. Additionally, the system may include a means to enhance vapor-liquid equilibrium in the ullage of the fuel tank and accordingly minimize vapor emission level.

DETAILED DESCRIPTION OF THE INVENTION

The present inventions now will be described more fully hereinafter, but not all embodiments of the invention are shown. Indeed, these inventions may be embodied in many different forms and should not be construed as limited to the embodiments set forth herein; rather, these embodiments are provided so that this disclosure will satisfy applicable legal requirements.

Figure 5:
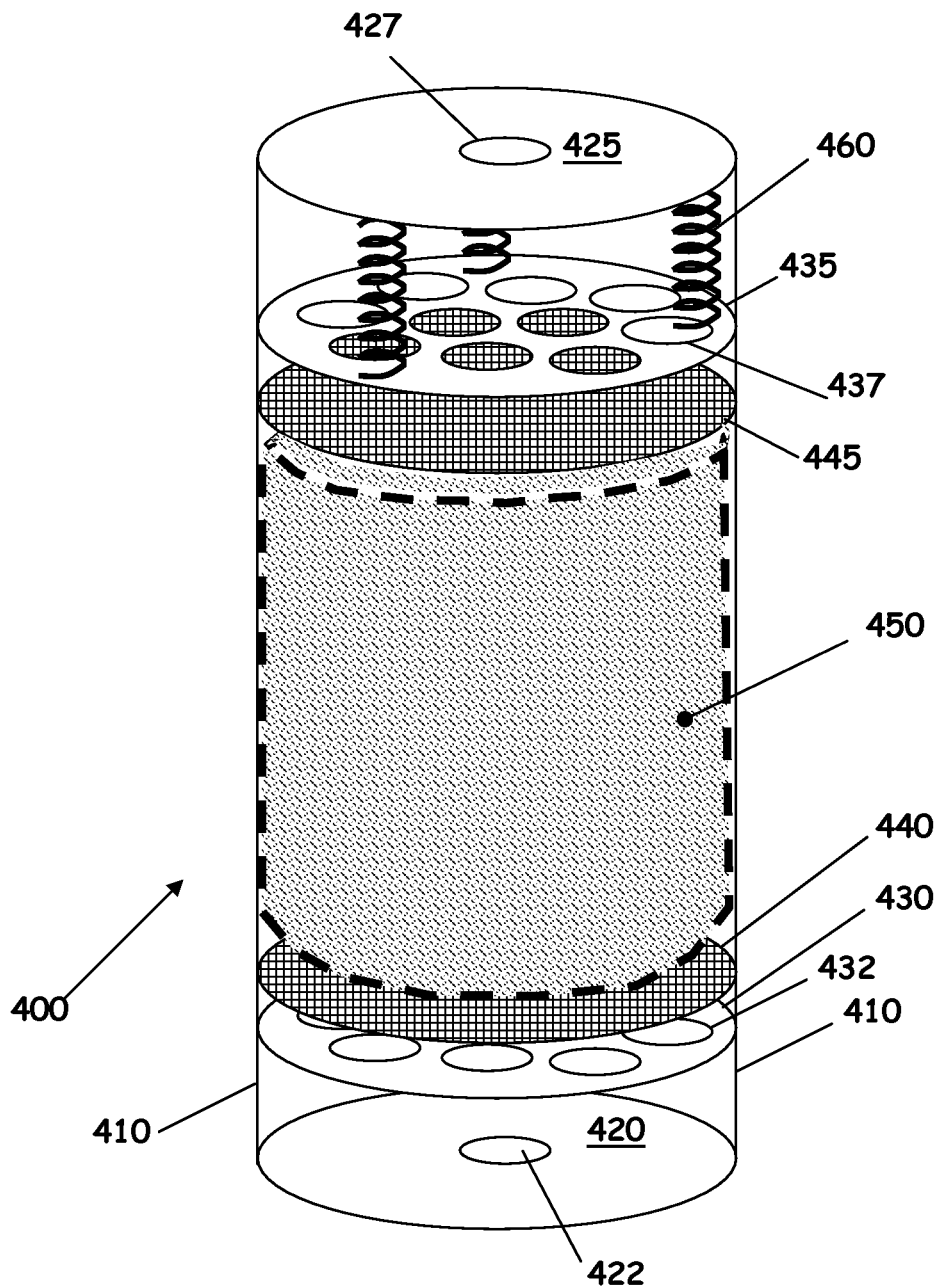
FIG. 5 illustrates a cross section view of a carbon canister.

The balanced EVR system of the present invention includes at least one canister containing adsorbents to control hydrocarbon emissions from tank 100. FIG. 5 shows a cross section of a canister 400 comprises a metal or plastic housing containing an adsorbent. The design is an example and not meant to be limiting. Here the canister 400 is cylindrical, with longitudinal wall 410, a first end 420 (here the bottom and inlet end for purposes of discussion) with inlet port 422, and a second end 425 (here the top and outlet end) with outlet port 427. Canister 400 may have a volume of 4-20 gallons or larger. Additionally, a length to diameter ratio (L/D) of the canister may be at least two. For non-cylindrical or complex-shaped units, the cross-sectional area may be at least 0.2 times the length of the bed. Canister 400 may include diffuser plates 430, 435 (with holes 432, 437) at the inlet/outlet ends to distribute the vapor/gas, thereby preventing channeling and fully utilizing the entire bed of adsorbent. Screens 440, 445 may be provided to secure the adsorbents within the canister. Additionally, the canister 400 may include a means 460 (such as a spring or springs) to compress the adsorbent 450 and allow for volume change compensation resulting from a settling of the adsorbent, an expansion or contraction of the canister 400 due to an increase or decrease in temperature, a entering of liquid into the canister, and/or a high volumetric flow rate of air and/or vapor through the canister.

Adsorbents 450 for use in the present invention include, but are not limited to, activated carbon, zeolite, activated alumina, silica, and other adsorbents capable of adsorbing hydrocarbon vapors. Suitable activated carbon for use as an adsorbent in the present invention may be derived from any carbon sources known in art. These include, but are not limited to, wood, cotton linters, peat, coal, coconut, lignite, carbohydrates, petroleum pitch, petroleum coke, coal tar pitch, fruit pits, nut shells, nut pits, sawdust, wood flour, synthetic polymer, and natural polymer, and combinations thereof. Furthermore, any forms of adsorbents may be used in the present invention. These include, but are not limited to, granular, pelletized, fibrous, and honeycomb structure.

In one embodiment of the present invention, pelletized activated carbon with a butane working capacity of greater than 5 g/100 ml, a butane ratio of greater that 50%, and a density of greater than 0.2 g/cc, is used as adsorbent.

In one embodiment of the present invention, pelletized activated carbon with a butane working capacity of greater than 10 g/100 ml, a butane ratio of greater that 75%, and a density of greater than 0.24 g/cc, is used as adsorbent.

In one embodiment of the present invention, pelletized activated carbon with a butane working capacity of greater than 11 g/100 ml, a butane ratio of greater that 85%, and a density of greater than 0.26 g/cc, is used as adsorbent.

The butane working capacity (BWC) of the adsorbent is measured using a standard method ASTM D-5228 known in arts. The butane ratio, which is a ratio of BWC to butane activity, of the adsorbent is measured using a standard method ASTM D-5228 known in arts. The density of the adsorbent is measured using a standard method ASTM D-2854 known in arts.

Figure 6:
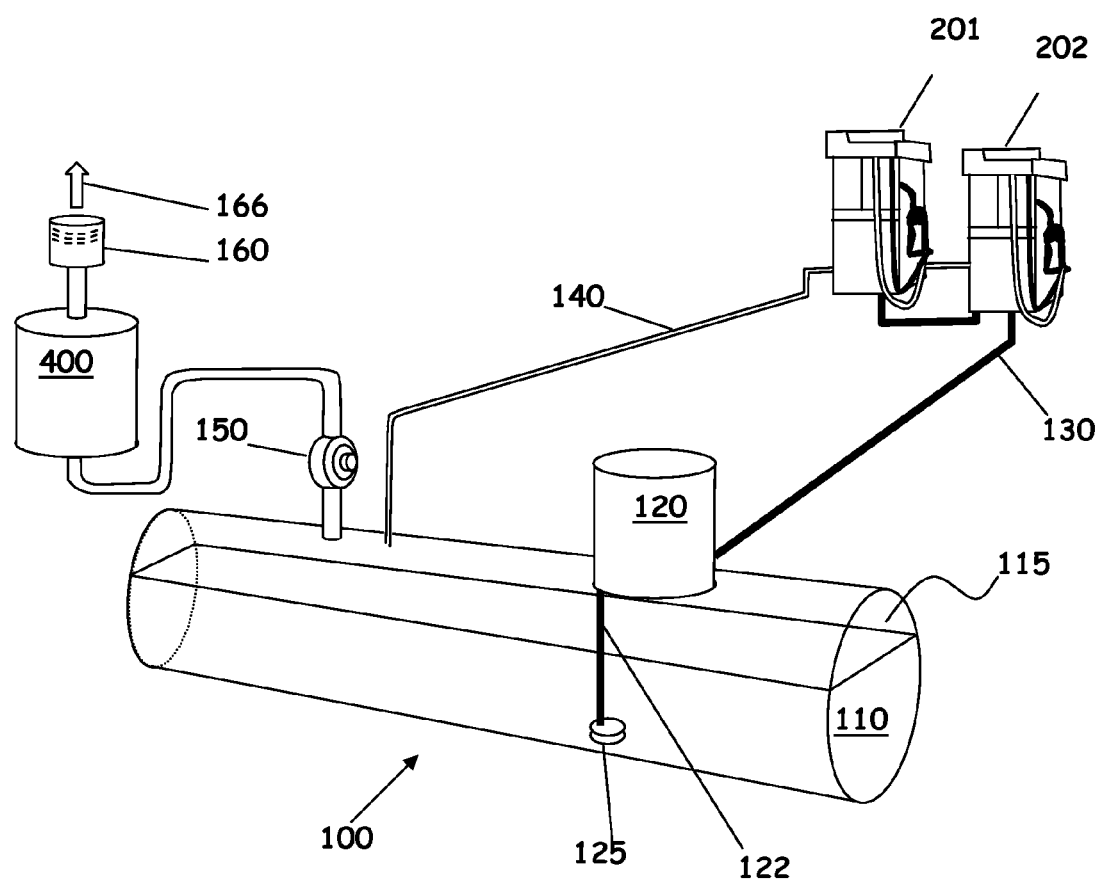
FIG. 6 illustrates a mode of operation using a carbon canister when no vehicles are being refueled.

FIG. 6 illustrates the canister 400 placed in series with the existing storage tank vent piping. If the canister is positioned in series, only one PV 150 (combination vacuum/pressure or set of valves as explained previously) may be needed for the vent system. If the canister 400 is placed in parallel (not shown), the canister may have a devoted PV valve 150 (or set of PV valves) that function as the primary tank pressure control valves, while another PV or pressure regulation valve (not shown) located on a canister bypass line (not shown) can be utilized for emergency under pressurization or over pressurization occurrences. In one embodiment of the present invention, the balanced EVR system may include the use of a restrictive orifice sized to maintain a target negative pressure during operational hours and prevent net positive pressures from exceeding regulatory requirements. For example, the aperture of the orifice may be related to the throughput of the gas station.

The balanced EVR system of the present invention allows the storage tank 100 to vent through the adsorbent canister 400. During periods of vapor growth (when the storage tank 100 pressure is increasing or has increased beyond the PV valve 150 positive setpoint as a result of the gasoline vapors reaching vapor-liquid equilibrium and/or because the ullage 115 vapors are warming up toward thermal equilibrium), air and vapor pass outward through the canister 400. The gasoline vapor is adsorbed onto the adsorbents in the canister, and fresh air 166 is vented to the open environment. The adsorbent canister 400 is sized to achieve target adsorption levels. The canister volume may be between 4-20 gallons or larger.

Figure 7:
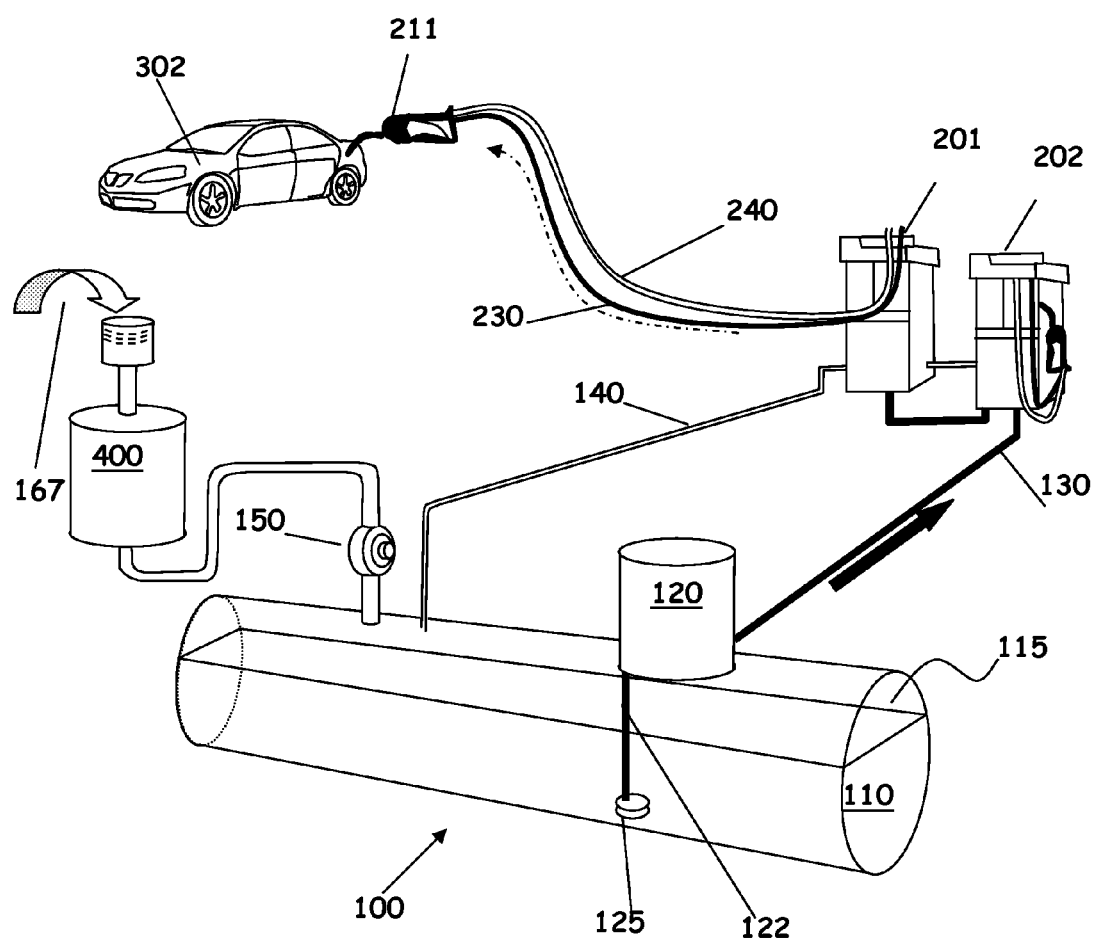
FIG. 7 illustrates a mode of operation using a carbon canister while fueling a vehicle that has an on-board refueling vapor recovery (ORVR) system.

FIG. 7 illustrates a mode of operation when an ORVR vehicle 302 is being filled with gasoline. The storage tank 100 pressure declines to a pressure equivalent to the lower setpoint of PV valve 150, at which point PV valve 150 opens. This allows fresh air 167 to be drawn from the atmosphere into the storage tank 100 through the adsorbent canister 400. The gasoline vapors previously adsorbed onto the adsorbent are then purged or desorbed into the incoming fresh air 167, and the adsorbent in the canister is regenerated. The desorbed vapors continue on with the incoming air, thus returning to the storage tank 100. The balanced EVR system of the present invention may be a single canister 400 or multiple canisters to treat each tank 100 or a group of tanks manifolded together.

Tables I, II, and III show calculated maximum hydrocarbon vent losses (in grams) per 1000 gallons of storage tank ullage 115 at a temperature of 70° F. and for a gasoline having a Reid vapor pressure (RVP) of 9 psi (typically denoted 9 RVP fuel). Similar tables may be constructed for fuels having other RVP values.

TABLE 1

Concentration of Hydrocarbons in Ullage Preceeding Station Shutdown
(% of Saturation at a Temperature of 70° F. for 9 RVP Fuel)

|  | 90% | 92% | 94% | 96% | 98% | 99% | 100% |
|---|---|---|---|---|---|---|---|
| Vented Emissions with no PV Control (g HC/1000 gal Ullage) | 265.7 | 216.9 | 166 | 112.9 | 57.6 | 29.1 | 0 |
| Total Vent Volume with no PV Control (gal/1000 gal Ullage) | 76 | 61.4 | 46.5 | 31.3 | 15.8 | 8 | 0 |
| Carbon Volume Required (gal/1000 gal Ullage) | 1.7 | 1.4 | 1.1 | 0.7 | 0.4 | 0.2 | 0 |
| Volume Air to Crack PV with dP of 6" w.c. = 14.9 gallons |  |  |  |  |  |  |  |
| Net Vented Volume with 6" wc. PV (gal/1000 gal Ullage) | 61.1 | 46.5 | 31.6 | 16.4 | 0.9 | 0 | 0 |
| Net Vented Emissions with 6" wc PV (g HC/1000 gal Ullage) | 215.9 | 164.4 | 111.8 | 58.1 | 3.3 | 0 | 0 |
| Percent of Uncontrolled Emissions | 81.3% | 75.8% | 67.3% | 51.4% | 5.7% | 0.0% | 0.0% |
| Carbon Volume Required (gal/1000 gal Ullage) | 1.4 | 1.1 | 0.7 | 0.4 | 0 | 0 | 0 |

TABLE II

Air + HC Vapor Vented (gallons/1000 gallons Ullage)
from Initial % Saturation at Various Temps for 9 RVP

| Temp (° F.) | 90% | 91% | 92% | 93% | 94% | 95% | 96% | 97% | 98% | 99% | 100% |
|---|---|---|---|---|---|---|---|---|---|---|---|
| 40 | 28.3 | 25.5 | 22.7 | 19.9 | 17.1 | 14.3 | 11.5 | 8.6 | 5.8 | 2.9 | 0.0 |
| 41 | 29.1 | 26.3 | 23.4 | 20.5 | 17.6 | 14.7 | 11.8 | 8.9 | 5.9 | 3.0 | 0.0 |
| 42 | 30.0 | 27.0 | 24.1 | 21.1 | 18.2 | 15.2 | 12.2 | 9.1 | 6.1 | 3.1 | 0.0 |
| 43 | 30.9 | 27.8 | 24.8 | 21.8 | 18.7 | 15.6 | 12.5 | 9.4 | 6.3 | 3.2 | 0.0 |
| 44 | 31.8 | 28.7 | 25.6 | 22.4 | 19.3 | 16.1 | 12.9 | 9.7 | 6.5 | 3.3 | 0.0 |
| 45 | 32.7 | 29.5 | 26.3 | 23.1 | 19.8 | 16.6 | 13.3 | 10.0 | 6.7 | 3.4 | 0.0 |
| 46 | 33.7 | 30.4 | 27.1 | 23.8 | 20.4 | 17.1 | 13.7 | 10.3 | 6.9 | 3.5 | 0.0 |
| 47 | 34.7 | 31.4 | 27.9 | 24.5 | 21.1 | 17.6 | 14.1 | 10.6 | 7.1 | 3.6 | 0.0 |
| 48 | 35.8 | 32.3 | 28.8 | 25.3 | 21.7 | 18.2 | 14.6 | 11.0 | 7.3 | 3.7 | 0.0 |
| 49 | 36.9 | 33.3 | 29.7 | 26.1 | 22.4 | 18.7 | 15.0 | 11.3 | 7.6 | 3.8 | 0.0 |
| 50 | 38.1 | 34.4 | 30.6 | 26.9 | 23.1 | 19.3 | 15.5 | 11.7 | 7.8 | 3.9 | 0.0 |
| 51 | 39.3 | 35.5 | 31.6 | 27.7 | 23.9 | 19.9 | 16.0 | 12.0 | 8.0 | 4.0 | 0.0 |
| 52 | 40.5 | 36.6 | 32.6 | 28.6 | 24.6 | 20.6 | 16.5 | 12.4 | 8.3 | 4.2 | 0.0 |
| 53 | 41.8 | 37.8 | 33.7 | 29.6 | 25.4 | 21.3 | 17.1 | 12.8 | 8.6 | 4.3 | 0.0 |
| 54 | 43.2 | 39.0 | 34.8 | 30.5 | 26.3 | 22.0 | 17.6 | 13.3 | 8.9 | 4.4 | 0.0 |
| 55 | 44.6 | 40.3 | 35.9 | 31.5 | 27.1 | 22.7 | 18.2 | 13.7 | 9.2 | 4.6 | 0.0 |
| 56 | 46.1 | 41.6 | 37.1 | 32.6 | 28.0 | 23.5 | 18.8 | 14.2 | 9.5 | 4.8 | 0.0 |
| 57 | 47.6 | 43.0 | 38.4 | 33.7 | 29.0 | 24.2 | 19.5 | 14.7 | 9.8 | 4.9 | 0.0 |

TABLE II-continued

Air + HC Vapor Vented (gallons/1000 gallons Ullage)
from Initial % Saturation at Various Temps for 9 RVP

| Temp (° F.) | 90% | 91% | 92% | 93% | 94% | 95% | 96% | 97% | 98% | 99% | 100% |
|---|---|---|---|---|---|---|---|---|---|---|---|
| 58 | 49.3 | 44.5 | 39.7 | 34.9 | 30.0 | 25.1 | 20.1 | 15.2 | 10.1 | 5.1 | 0.0 |
| 59 | 51.0 | 46.0 | 41.1 | 36.1 | 31.0 | 26.0 | 20.8 | 15.7 | 10.5 | 5.3 | 0.0 |
| 60 | 52.7 | 47.6 | 42.5 | 37.3 | 32.1 | 26.9 | 21.6 | 16.2 | 10.9 | 5.5 | 0.0 |
| 61 | 54.6 | 49.3 | 44.0 | 38.7 | 33.3 | 27.8 | 22.4 | 16.8 | 11.3 | 5.7 | 0.0 |
| 62 | 56.5 | 51.1 | 45.6 | 40.0 | 34.5 | 28.8 | 23.2 | 17.4 | 11.7 | 5.9 | 0.0 |
| 63 | 58.5 | 52.9 | 47.2 | 41.5 | 35.7 | 29.9 | 24.0 | 18.1 | 12.1 | 6.1 | 0.0 |
| 64 | 60.7 | 54.8 | 49.0 | 43.0 | 37.0 | 31.0 | 24.9 | 18.8 | 12.6 | 6.3 | 0.0 |
| 65 | 62.9 | 56.9 | 50.8 | 44.6 | 38.4 | 32.2 | 25.8 | 19.5 | 13.0 | 6.5 | 0.0 |
| 66 | 65.3 | 59.0 | 52.7 | 46.3 | 39.9 | 33.4 | 26.8 | 20.2 | 13.5 | 6.8 | 0.0 |
| 67 | 67.7 | 61.2 | 54.7 | 48.1 | 41.4 | 34.7 | 27.9 | 21.0 | 14.1 | 7.1 | 0.0 |
| 68 | 70.3 | 63.6 | 56.8 | 49.9 | 43.0 | 36.0 | 29.0 | 21.8 | 14.6 | 7.3 | 0.0 |
| 69 | 73.1 | 66.1 | 59.0 | 51.9 | 44.7 | 37.4 | 30.1 | 22.7 | 15.2 | 7.6 | 0.0 |
| 70 | 76.0 | 68.7 | 61.4 | 54.0 | 46.5 | 39.0 | 31.3 | 23.6 | 15.8 | 8.0 | 0.0 |
| 71 | 79.0 | 71.5 | 63.9 | 56.2 | 48.4 | 40.5 | 32.6 | 24.6 | 16.5 | 8.3 | 0.0 |
| 72 | 82.2 | 74.4 | 66.5 | 58.5 | 50.4 | 42.2 | 34.0 | 25.6 | 17.2 | 8.6 | 0.0 |
| 73 | 85.6 | 77.5 | 69.3 | 60.9 | 52.5 | 44.0 | 35.4 | 26.7 | 17.9 | 9.0 | 0.0 |
| 74 | 89.2 | 80.8 | 72.2 | 63.5 | 54.8 | 45.9 | 36.9 | 27.9 | 18.7 | 9.4 | 0.0 |
| 75 | 93.0 | 84.2 | 75.3 | 66.3 | 57.1 | 47.9 | 38.6 | 29.1 | 19.5 | 9.8 | 0.0 |
| 76 | 97.1 | 87.9 | 78.6 | 69.2 | 59.7 | 50.0 | 40.3 | 30.4 | 20.4 | 10.3 | 0.0 |
| 77 | 101.4 | 91.8 | 82.1 | 72.3 | 62.4 | 52.3 | 42.1 | 31.8 | 21.3 | 10.7 | 0.0 |
| 78 | 105.9 | 96.0 | 85.8 | 75.6 | 65.2 | 54.7 | 44.0 | 33.3 | 22.3 | 11.2 | 0.0 |
| 79 | 110.8 | 100.4 | 89.8 | 79.1 | 68.3 | 57.3 | 46.1 | 34.8 | 23.4 | 11.8 | 0.0 |
| 80 | 116.0 | 105.1 | 94.0 | 82.9 | 71.5 | 60.0 | 48.3 | 36.5 | 24.5 | 12.3 | 0.0 |
| 81 | 121.5 | 110.1 | 98.6 | 86.9 | 75.0 | 62.9 | 50.7 | 38.3 | 25.7 | 13.0 | 0.0 |
| 82 | 127.4 | 115.5 | 103.4 | 91.1 | 78.7 | 66.1 | 53.3 | 40.2 | 27.0 | 13.6 | 0.0 |
| 83 | 133.7 | 121.2 | 108.6 | 95.7 | 82.7 | 69.4 | 56.0 | 42.3 | 28.4 | 14.3 | 0.0 |
| 84 | 140.5 | 127.4 | 114.1 | 100.6 | 86.9 | 73.0 | 58.9 | 44.5 | 29.9 | 15.1 | 0.0 |
| 85 | 147.7 | 134.0 | 120.1 | 105.9 | 91.5 | 76.9 | 62.0 | 46.9 | 31.5 | 15.9 | 0.0 |
| 86 | 155.5 | 141.1 | 126.5 | 111.6 | 96.5 | 81.1 | 65.4 | 49.5 | 33.3 | 16.8 | 0.0 |
| 87 | 164.0 | 148.8 | 133.4 | 117.8 | 101.8 | 85.6 | 69.1 | 52.3 | 35.2 | 17.8 | 0.0 |
| 88 | 173.0 | 157.1 | 140.9 | 124.4 | 107.6 | 90.5 | 73.1 | 55.3 | 37.2 | 18.8 | 0.0 |
| 89 | 182.9 | 166.1 | 149.0 | 131.6 | 113.9 | 95.8 | 77.4 | 58.6 | 39.5 | 19.9 | 0.0 |
| 90 | 193.5 | 175.8 | 157.8 | 139.4 | 120.7 | 101.6 | 82.1 | 62.2 | 41.9 | 21.2 | 0.0 |
| 91 | 205.1 | 186.4 | 167.4 | 147.9 | 128.1 | 107.8 | 87.2 | 66.1 | 44.5 | 22.5 | 0.0 |
| 92 | 217.7 | 197.9 | 177.8 | 157.2 | 136.2 | 114.7 | 92.7 | 70.3 | 47.4 | 24.0 | 0.0 |
| 93 | 231.4 | 210.5 | 189.1 | 167.3 | 145.0 | 122.2 | 98.9 | 75.0 | 50.6 | 25.6 | 0.0 |
| 94 | 246.5 | 224.3 | 201.6 | 178.4 | 154.7 | 130.4 | 105.6 | 80.1 | 54.1 | 27.4 | 0.0 |
| 95 | 263.0 | 239.4 | 215.3 | 190.6 | 165.4 | 139.5 | 113.0 | 85.8 | 57.9 | 29.3 | 0.0 |
| 96 | 281.1 | 256.1 | 230.4 | 204.1 | 177.1 | 149.5 | 121.1 | 92.0 | 62.2 | 31.5 | 0.0 |
| 97 | 301.2 | 274.5 | 247.1 | 219.0 | 190.2 | 160.6 | 130.2 | 99.0 | 66.9 | 33.9 | 0.0 |
| 98 | 323.4 | 294.9 | 265.7 | 235.6 | 204.7 | 172.9 | 140.3 | 106.7 | 72.2 | 36.6 | 0.0 |
| 99 | 348.2 | 317.7 | 286.3 | 254.1 | 220.9 | 186.7 | 151.6 | 115.4 | 78.1 | 39.7 | 0.0 |
| 100 | 375.8 | 343.1 | 309.4 | 274.7 | 239.0 | 202.2 | 164.3 | 125.2 | 84.8 | 43.1 | 0.0 |
| 101 | 406.7 | 371.6 | 335.3 | 298.0 | 259.4 | 219.7 | 178.6 | 136.2 | 92.3 | 46.9 | 0.0 |
| 102 | 441.6 | 403.7 | 364.6 | 324.2 | 282.5 | 239.4 | 194.8 | 148.7 | 100.9 | 51.3 | 0.0 |
| 103 | 481.1 | 440.2 | 397.8 | 354.1 | 308.8 | 261.9 | 213.3 | 162.9 | 110.7 | 56.4 | 0.0 |
| 104 | 526.0 | 481.7 | 435.7 | 388.2 | 338.8 | 287.7 | 234.5 | 179.3 | 121.9 | 62.2 | 0.0 |
| 105 | 577.5 | 529.3 | 479.3 | 427.3 | 373.4 | 317.4 | 259.0 | 198.3 | 135.0 | 68.9 | 0.0 |

TABLE III

HC Vapor Vented (grams/1000 gallons Ullage) from
Initial % Saturation at Various Temps for 9 RVP

| Temp | 90% | 91% | 92% | 93% | 94% | 95% | 96% | 97% | 98% | 99% | 100% |
|---|---|---|---|---|---|---|---|---|---|---|---|
| 40.0 | 59.9 | 54.3 | 48.6 | 42.9 | 37.0 | 31.1 | 25.0 | 18.9 | 12.7 | 6.4 | 0.0 |
| 41.0 | 62.6 | 56.8 | 50.9 | 44.8 | 38.7 | 32.5 | 26.2 | 19.8 | 13.3 | 6.7 | 0.0 |
| 42.0 | 65.5 | 59.4 | 53.2 | 46.9 | 40.5 | 34.0 | 27.4 | 20.7 | 13.9 | 7.0 | 0.0 |
| 43.0 | 68.5 | 62.1 | 55.7 | 49.1 | 42.4 | 35.6 | 28.7 | 21.7 | 14.6 | 7.3 | 0.0 |
| 44.0 | 71.7 | 65.0 | 58.2 | 51.4 | 44.4 | 37.3 | 30.0 | 22.7 | 15.2 | 7.7 | 0.0 |
| 45.0 | 75.1 | 68.1 | 61.0 | 53.8 | 46.4 | 39.0 | 31.4 | 23.8 | 16.0 | 8.0 | 0.0 |
| 46.0 | 78.6 | 71.3 | 63.9 | 56.3 | 48.6 | 40.9 | 32.9 | 24.9 | 16.7 | 8.4 | 0.0 |
| 47.0 | 82.3 | 74.7 | 66.9 | 59.0 | 51.0 | 42.8 | 34.5 | 26.1 | 17.5 | 8.8 | 0.0 |
| 48.0 | 86.2 | 78.2 | 70.1 | 61.8 | 53.4 | 44.9 | 36.2 | 27.3 | 18.4 | 9.3 | 0.0 |
| 49.0 | 90.4 | 82.0 | 73.5 | 64.8 | 56.0 | 47.0 | 37.9 | 28.7 | 19.3 | 9.7 | 0.0 |
| 50.0 | 94.8 | 86.0 | 77.0 | 68.0 | 58.7 | 49.3 | 39.8 | 30.1 | 20.2 | 10.2 | 0.0 |
| 51.0 | 99.4 | 90.2 | 80.8 | 71.3 | 61.6 | 51.8 | 41.7 | 31.6 | 21.2 | 10.7 | 0.0 |
| 52.0 | 104.3 | 94.6 | 84.8 | 74.8 | 64.7 | 54.3 | 43.8 | 33.1 | 22.3 | 11.2 | 0.0 |
| 53.0 | 109.4 | 99.3 | 89.0 | 78.5 | 67.9 | 57.0 | 46.0 | 34.8 | 23.4 | 11.8 | 0.0 |
| 54.0 | 114.9 | 104.3 | 93.5 | 82.5 | 71.3 | 59.9 | 48.3 | 36.5 | 24.6 | 12.4 | 0.0 |
| 55.0 | 120.7 | 109.5 | 98.2 | 86.6 | 74.9 | 62.9 | 50.8 | 38.4 | 25.8 | 13.0 | 0.0 |

TABLE III-continued

HC Vapor Vented (grams/1000 gallons Ullage) from
Initial % Saturation at Various Temps for 9 RVP

| Temp | 90% | 91% | 92% | 93% | 94% | 95% | 96% | 97% | 98% | 99% | 100% |
|---|---|---|---|---|---|---|---|---|---|---|---|
| 56.0 | 126.8 | 115.1 | 103.2 | 91.1 | 78.7 | 66.2 | 53.4 | 40.4 | 27.2 | 13.7 | 0.0 |
| 57.0 | 133.3 | 121.0 | 108.5 | 95.7 | 82.8 | 69.6 | 56.1 | 42.5 | 28.6 | 14.4 | 0.0 |
| 58.0 | 140.1 | 127.2 | 114.1 | 100.7 | 87.1 | 73.2 | 59.1 | 44.7 | 30.1 | 15.2 | 0.0 |
| 59.0 | 147.4 | 133.9 | 120.0 | 106.0 | 91.6 | 77.0 | 62.2 | 47.0 | 31.6 | 16.0 | 0.0 |
| 60.0 | 155.2 | 140.9 | 126.4 | 111.6 | 96.5 | 81.1 | 65.5 | 49.5 | 33.3 | 16.8 | 0.0 |
| 61.0 | 163.4 | 148.4 | 133.1 | 117.5 | 101.6 | 85.5 | 69.0 | 52.2 | 35.1 | 17.7 | 0.0 |
| 62.0 | 172.1 | 156.3 | 140.2 | 123.8 | 107.1 | 90.1 | 72.7 | 55.0 | 37.0 | 18.7 | 0.0 |
| 63.0 | 181.4 | 164.7 | 147.8 | 130.5 | 112.9 | 95.0 | 76.7 | 58.0 | 39.1 | 19.7 | 0.0 |
| 64.0 | 191.2 | 173.7 | 155.9 | 137.7 | 119.1 | 100.2 | 80.9 | 61.2 | 41.2 | 20.8 | 0.0 |
| 65.0 | 201.7 | 183.3 | 164.5 | 145.3 | 125.7 | 105.7 | 85.4 | 64.7 | 43.5 | 22.0 | 0.0 |
| 66.0 | 212.9 | 193.5 | 173.6 | 153.4 | 132.7 | 111.7 | 90.2 | 68.3 | 46.0 | 23.2 | 0.0 |
| 67.0 | 224.8 | 204.3 | 183.4 | 162.0 | 140.2 | 118.0 | 95.3 | 72.2 | 48.6 | 24.5 | 0.0 |
| 68.0 | 237.6 | 215.9 | 193.8 | 171.3 | 148.2 | 124.8 | 100.8 | 76.4 | 51.4 | 26.0 | 0.0 |
| 69.0 | 251.1 | 228.3 | 204.9 | 181.1 | 156.8 | 132.0 | 106.7 | 80.8 | 54.4 | 27.5 | 0.0 |
| 70.0 | 265.7 | 241.5 | 216.9 | 191.7 | 166.0 | 139.7 | 112.9 | 85.5 | 57.6 | 29.1 | 0.0 |
| 71.0 | 281.2 | 255.7 | 229.6 | 203.0 | 175.8 | 148.0 | 119.6 | 90.6 | 61.1 | 30.8 | 0.0 |
| 72.0 | 297.8 | 270.8 | 243.2 | 215.1 | 186.3 | 156.9 | 126.8 | 96.1 | 64.7 | 32.7 | 0.0 |
| 73.0 | 315.6 | 287.1 | 257.9 | 228.0 | 197.5 | 166.4 | 134.5 | 102.0 | 68.7 | 34.7 | 0.0 |
| 74.0 | 334.7 | 304.5 | 273.6 | 242.0 | 209.6 | 176.6 | 142.8 | 108.3 | 73.0 | 36.9 | 0.0 |
| 75.0 | 355.2 | 323.2 | 290.4 | 256.9 | 222.6 | 187.6 | 151.7 | 115.0 | 77.5 | 39.2 | 0.0 |
| 76.0 | 377.3 | 343.3 | 308.6 | 273.0 | 236.6 | 199.4 | 161.3 | 122.3 | 82.5 | 41.7 | 0.0 |
| 77.0 | 401.0 | 365.0 | 328.1 | 290.3 | 251.7 | 212.1 | 171.6 | 130.2 | 87.8 | 44.4 | 0.0 |
| 78.0 | 426.6 | 388.3 | 349.1 | 309.0 | 267.9 | 225.9 | 182.8 | 138.7 | 93.5 | 47.3 | 0.0 |
| 79.0 | 454.1 | 413.5 | 371.8 | 329.2 | 285.5 | 240.7 | 194.8 | 147.9 | 99.7 | 50.5 | 0.0 |
| 80.0 | 483.9 | 440.7 | 396.4 | 350.9 | 304.4 | 256.7 | 207.9 | 157.8 | 106.5 | 53.9 | 0.0 |
| 81.0 | 516.1 | 470.1 | 422.9 | 374.5 | 324.9 | 274.1 | 222.0 | 168.5 | 113.8 | 57.6 | 0.0 |
| 82.0 | 550.9 | 501.9 | 451.6 | 400.1 | 347.2 | 292.9 | 237.3 | 180.2 | 121.7 | 61.6 | 0.0 |
| 83.0 | 588.7 | 536.4 | 482.8 | 427.8 | 371.4 | 313.4 | 253.9 | 192.9 | 130.3 | 66.0 | 0.0 |
| 84.0 | 629.7 | 574.0 | 516.7 | 458.0 | 397.6 | 335.7 | 272.0 | 206.7 | 139.6 | 70.7 | 0.0 |
| 85.0 | 674.3 | 614.8 | 553.6 | 490.8 | 426.2 | 359.9 | 291.8 | 221.8 | 149.9 | 75.9 | 0.0 |
| 86.0 | 722.9 | 659.2 | 593.8 | 526.6 | 457.5 | 386.4 | 313.3 | 238.2 | 161.0 | 81.6 | 0.0 |
| 87.0 | 775.9 | 707.8 | 637.8 | 565.7 | 491.6 | 415.4 | 336.9 | 256.3 | 173.3 | 87.9 | 0.0 |
| 88.0 | 833.9 | 760.9 | 685.8 | 608.5 | 529.0 | 447.1 | 362.8 | 276.0 | 186.7 | 94.7 | 0.0 |
| 89.0 | 897.4 | 819.1 | 738.5 | 655.5 | 570.0 | 481.9 | 391.2 | 297.7 | 201.4 | 102.2 | 0.0 |
| 90.0 | 967.1 | 883.0 | 796.4 | 707.1 | 615.1 | 520.2 | 422.4 | 321.6 | 217.7 | 110.5 | 0.0 |
| 91.0 | 1043.7 | 953.3 | 860.1 | 763.9 | 664.8 | 562.5 | 456.9 | 348.0 | 235.7 | 119.7 | 0.0 |
| 92.0 | 1128.2 | 1030.9 | 930.4 | 826.7 | 719.7 | 609.2 | 495.1 | 377.3 | 255.6 | 129.9 | 0.0 |
| 93.0 | 1221.6 | 1116.6 | 1008.2 | 896.2 | 780.5 | 661.0 | 537.4 | 409.7 | 277.7 | 141.2 | 0.0 |
| 94.0 | 1325.1 | 1211.7 | 1094.5 | 973.4 | 848.1 | 718.5 | 584.4 | 445.8 | 302.3 | 153.7 | 0.0 |
| 95.0 | 1440.0 | 1317.4 | 1190.5 | 1059.2 | 923.3 | 782.6 | 636.9 | 486.0 | 329.8 | 167.8 | 0.0 |
| 96.0 | 1568.1 | 1435.3 | 1297.8 | 1155.1 | 1007.4 | 854.3 | 695.7 | 531.2 | 360.6 | 183.6 | 0.0 |
| 97.0 | 1711.3 | 1567.1 | 1417.5 | 1262.5 | 1101.6 | 934.8 | 761.6 | 581.8 | 395.2 | 201.4 | 0.0 |
| 98.0 | 1871.8 | 1715.0 | 1552.2 | 1383.2 | 1207.7 | 1025.3 | 835.9 | 639.0 | 434.3 | 221.4 | 0.0 |
| 99.0 | 2052.5 | 1881.6 | 1704.0 | 1519.4 | 1327.4 | 1127.7 | 920.0 | 703.7 | 478.7 | 244.2 | 0.0 |
| 100.0 | 2256.7 | 2070.0 | 1875.8 | 1673.6 | 1463.1 | 1243.9 | 1015.5 | 777.4 | 529.1 | 270.2 | 0.0 |
| 101.0 | 2488.4 | 2284.0 | 2071.1 | 1849.1 | 1617.7 | 1376.3 | 1124.4 | 861.5 | 586.9 | 299.9 | 0.0 |
| 102.0 | 2752.4 | 2528.1 | 2294.1 | 2049.8 | 1794.6 | 1528.1 | 1249.5 | 958.1 | 653.3 | 334.2 | 0.0 |
| 103.0 | 3054.8 | 2808.0 | 2550.0 | 2280.3 | 1998.2 | 1702.9 | 1393.6 | 1069.7 | 730.1 | 373.9 | 0.0 |
| 104.0 | 3403.1 | 3130.7 | 2845.5 | 2546.7 | 2233.6 | 1905.3 | 1560.9 | 1199.3 | 819.4 | 420.1 | 0.0 |
| 105.0 | 3806.5 | 3504.8 | 3188.5 | 2856.5 | 2507.8 | 2141.4 | 1756.2 | 1350.9 | 924.1 | 474.3 | 0.0 |

At a temperature of 70° F., air completely saturated with 9 RVP fuel contains 34.4% fuel by volume or 3.68 grams fuel per gallon air. It is estimated that during a typical operating day, the tank ullage space 115 may have a gasoline hydrocarbon concentration of about 94% for 9 RVP fuel saturation at a temperature of 70° F. At 94% of saturation, air contains 32.3% gasoline vapor by volume or 3.46 grams gasoline per gallon air. When the station shuts down, the tank ullage space 115 will gradually rise from 94% saturation (32.3% hydrocarbon) to equilibrium at 100% saturation (34.4% hydrocarbon). Without a PV control 150 on the tank 100, vented emissions would be about 166 grams of hydrocarbon per 1000 gallons of ullage 115. Typical ullage volumes could be from about 5,000 gallons to about 80,000 gallons, resulting in total vent hydrocarbon losses of about 830 grams to about 13,280 grams of hydrocarbons, respectively. To capture the emissions, about 1.1 gallons of the activated carbon adsorbent having a BWC of 11 are required per 1000 gallons of ullage, or about 5.5-87.4 gallons of the pelletized activated carbon adsorbent having a BWC of 11 are required for a tank 100 having an ullage 115 of 5,000 to 80,000 gallons.

Preliminary laboratory testing shows that such canisters of the present invention operate with suitable capacity to collect gasoline vapors to required levels.

The balanced EVR system of the present invention utilizing adsorbent canister 400, offers several advantages over competitive balanced systems. It may be smaller in size, and consume lower operation and maintenance cost. Furthermore, it provides significant ease in operation and maintenance. A competitive bladder system, which is relatively costly, larger in size (usually 500 gallon tank with a bladder inside), and mechanically complicated with vacuum pumps and filler nozzles. The competitive membrane systems and thermal oxidizers are relatively expensive, larger in size, and quite costly to operate. The invention EVR system uses adsorbent canisters that have no moving parts and requiring no blowers or pumps. Furthermore, no electrical power is needed for operating the invention system, other than for ISD (in station diagnostic) systems. By having an adsorbent canister 400 in-line with the tank vent 160, the fresh air 167 that feeds through the canister 400 and desorbs hydrocarbons from the canister will reduce the level of hydrocarbon dilution in the tank ullage 115. The resulting level of vapor growth will therefore be reduced.

Figure 8:
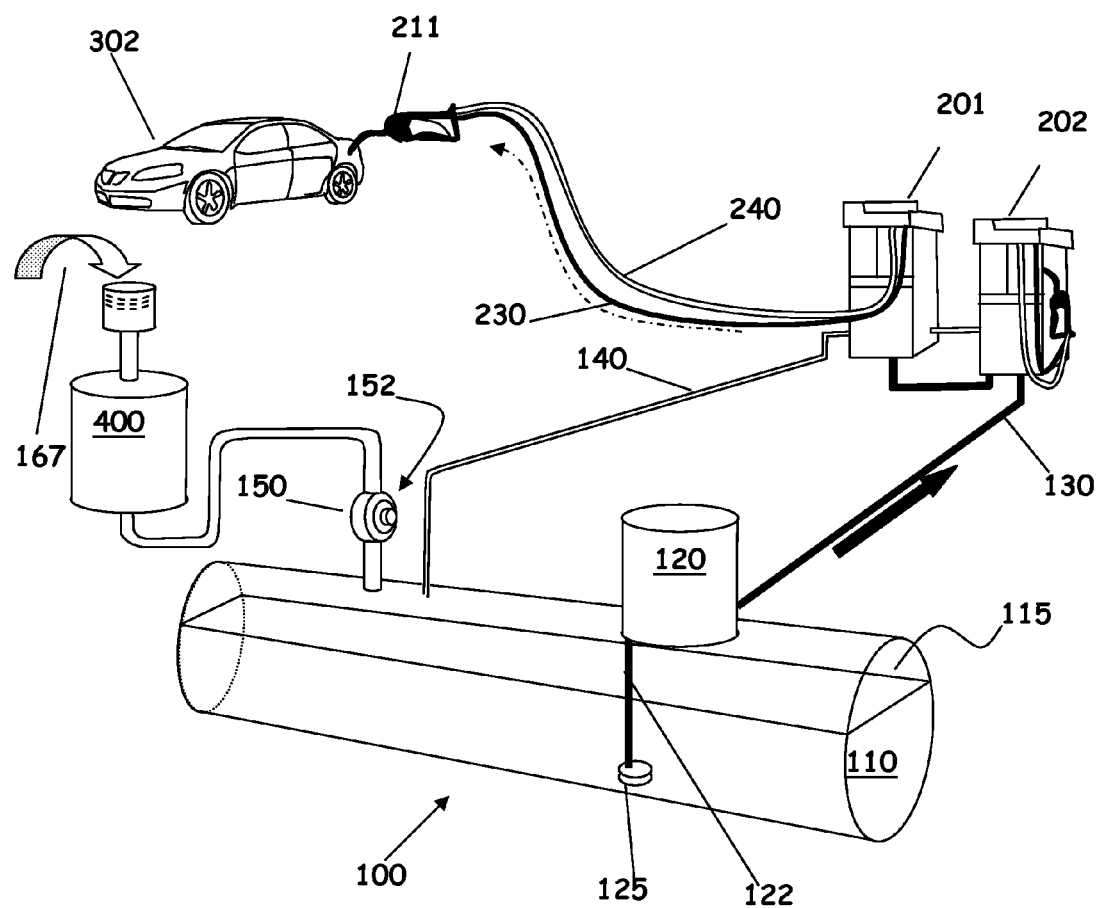
FIG. 8 illustrates a mode of operation using a carbon canister and a low pressure setting on a relief valve.

In another embodiment shown in FIG. 8, an adsorbent canister 400 is fitted on the vent-side of storage tank 100 having a PV valve 150 with a positive setpoint 152 of 0.25 inches w.c., or with no PV valve at all. The normal operating pressure of the balanced system will not exceed 0.25 inches w.c. Since the pressure cannot exceed 0.25 inches w.c., the regulation requirements are automatically met. Therefore, system sealing requirements are less stringent (it being assumed that leaks are unlikely to occur at pressures less than 0.25 inches w.c.). If no PV valve 150 is utilized, the storage tank 100 vacuum will not exceed the pressure drop of the induced flow through canister 400 and/or dispenser air/vapor return line 240. By operating at a very low, non-traditional level of vacuum, that is, very close to atmospheric pressure, fugitive in-leakage will be minimized. This will further reduce the level of sealing required and will reduce the amount of fresh air that feeds into the system, since the majority of makeup air 167 will be forced through canister 400 (the least restrictive path for flow), which will add hydrocarbons to the incoming air 167 during hydrocarbon desorption. By operating a system without a PV valve 150 and/or at a reduced level of vacuum, a larger adsorbent canister 400 may be required. This is because as vapor-liquid equilibrium is approached, all of the resulting vapor/gas expansion will be forced through canister 400.

For instance, typical balanced system operates at a slight vacuum of −5 inch w.c., with vapor concentration in the ullage space 115 typically at a concentration of about 94% (relative to the saturation concentration). If the system is not allowed to vent, the ullage space could reach a pressure of +4 inches w.c. when vapor liquid equilibrium is established. If the system is allowed to vent at 1 inch w.c., the systems would only vent about 33% of the total possible volume of air+vapor that develops. If the system operates as an open system, the total possible venting volume would be 100% of the total air+vapor that develops or three times the level of loading. The capacity requirement of canister 400 could be up to three times higher without a PV valve 150 and/or operating as an open system. The relevant regulatory issue remains to ensure vapor emissions are met. A small amount of hydrocarbons may diffuse into the canister 400 and be adsorbed, but most hydrocarbon adsorption by the canister 400 would be of convectively loaded hydrocarbons only transferred into the canister 400 during periods of vapor growth.

If the system has a vent system with PV 150 control that holds tank pressure between a vacuum of −5 inches w.c. and a positive relief pressure of 1 inch w.c., the molar volume (gasoline mol/1000 gal ullage) would have to increase by 14.9% before the PV valve 150 would allow air+vapor to escape. Below this value, no hydrocarbons would escape, resulting in a 32.7% potential reduction in emissions, but above this relief pressure, 111.8 grams of hydrocarbon per 1000 gallons of ullage could still escape. To capture these emissions would require 0.7 gallons of 11 BWC carbon per 1000 gallons of ullage, a significant reduction in carbon compared to having no pressure valve.

By operating the storage tank 100 at an essentially constant lower maximum pressure (over-pressure setting), the in-station diagnostic (ISD) system (not shown) may be down-sized from that required under typical operating pressure conditions. Pressures would not have to be constantly recorded and averaged. A simple over-pressurization alarm system would be required. Moreover, PV installation, maintenance, and replacement costs could be avoided. This would reduce operational and capital costs.

Another embodiment of the invention seeks to saturate incoming fresh air with hydrocarbons. Vapor growth within the storage tank 100 is largely due to fresh air (containing no hydrocarbons) being introduced into the storage tank 100 to make up for the volume of dispensed liquid gasoline. Air is introduced primarily through the vent 160, but fresh air is also introduced through the filler nozzle 211 or through system leaks. Vapor growth may be reduced by causing the fresh air introduced into the system to become pre-equilibrated with gasoline vapors or to saturate the tank ullage space 115 with hydrocarbons while the station is in operation. Unlike the systems disclosed in U.S. Pat. No. 6,763,856, the vapor recovery systems of the present invention do not require a separate gaseous flow conditioning apparatus. The means to enhance the vapor equilibrium in the ullage space are installed inside the fuel tank itself.

If the ullage space could be kept continuously saturated ("active saturation") with gasoline vapor (e.g. 100% of saturation instead of the typical approximately 94%, then little or no vapor growth would occur). Continuous saturation might be achieved by saturating the incoming air, or by keeping the ullage space itself saturated. By adding a sprayer or other mass transfer device at an appropriate location inside the storage tank to keep the vapor concentration near 100% saturation (equilibrium), there can be a marked reduction in potential emissions, and a reduced carbon requirement. If the vapor concentration is kept at 100% saturation, there will be no vapor growth, no hydrocarbon emissions, and no carbon requirement. A realistic case may be to keep the vapor concentration to 99% saturation. Then, at a temperature of 70° F. and with 9 RVP fuel, emissions in the absence of a PV valve would be only 29.1 grams hydrocarbon per 1000 gallons ullage, which would require only 0.2 gallons of carbon per 1000 gallons ullage, a further significant reduction in carbon compared with a system having a PV control but no ullage space active saturation.

If in addition to active saturation, a PV valve 150 is utilized with range from 5 inches vacuum to 1 inch positive pressure, there would be no need for a carbon canister.

The benefit of increasing the active saturation of the vapor space includes: (1) decreased potential emissions or hydrocarbon atmospheric loading, (2) a reduced carbon volume requirement if a PV valve is not utilized (to reduce costs and maintenance requirements), or (3) to eliminate the need for a hydrocarbon processor if a PV valve with adequate pressure range is utilized.

Several methods are envisioned for achieving vapor liquid equilibrium of the makeup air or the ullage vapor. A few examples are outlined below.

Figure 9:
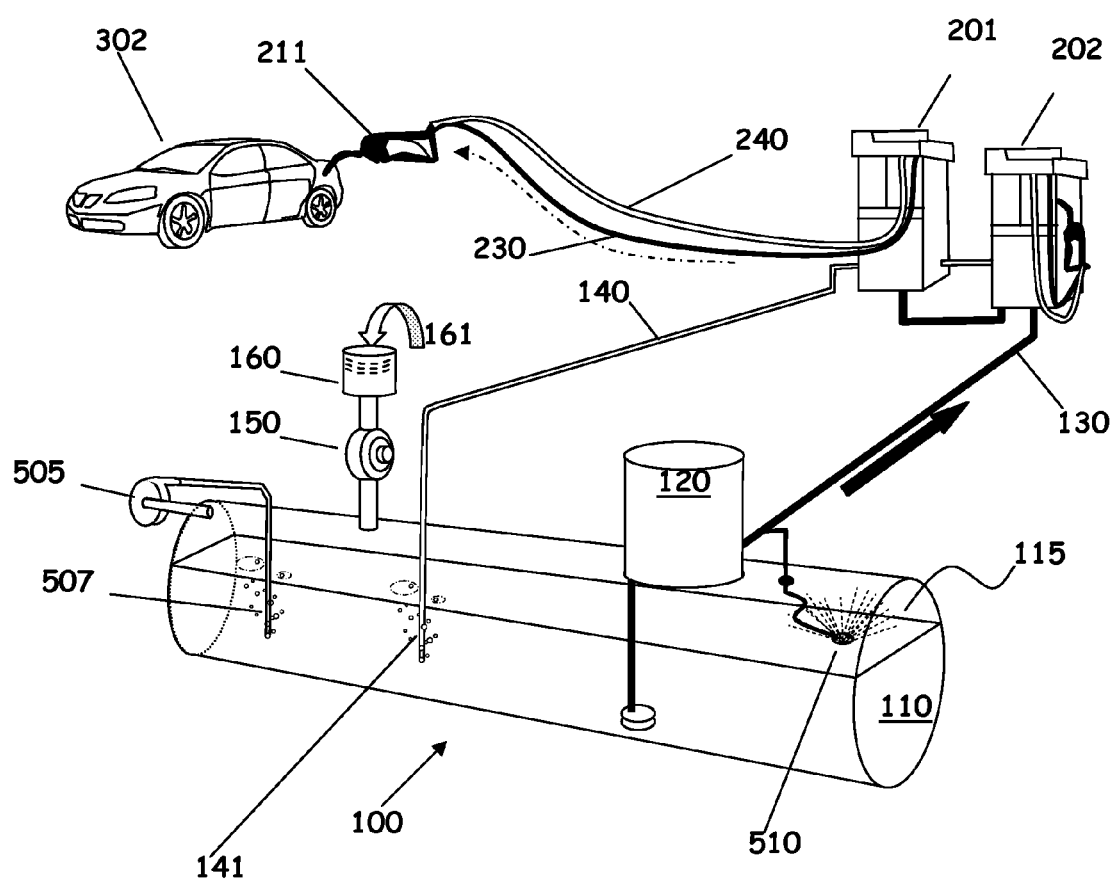
FIG. 9 illustrates a mode of operation using devices to saturate air in the tank.

FIG. 9 shows the air/vapor return line 140 extended below the level of liquid 110 in tank 100, so that returning air and vapor are bubbled through the liquid as shown at 141. This should more rapidly equilibrate the incoming air. Another method of more rapidly equilibrating the tank contents is by using a blower or air pump 505 to circulate from ullage space 115 through sparger 507. Another method is to spray liquid gasoline into the ullage space 115, for example by taking some fuel from pump outlet line 130 and spraying it within the ullage space 115 using one or more floater sprayer device 510 that floats on the surface of liquid fuel 110. Unlike the method taught in U.S. Pat. No. 6,763,856, the present invention requires no separate apparatus for conditioning/saturating of the gaseous flow prior to its entering the fuel tank. As a result, the method of the present invention is simpler.

Figure 10:
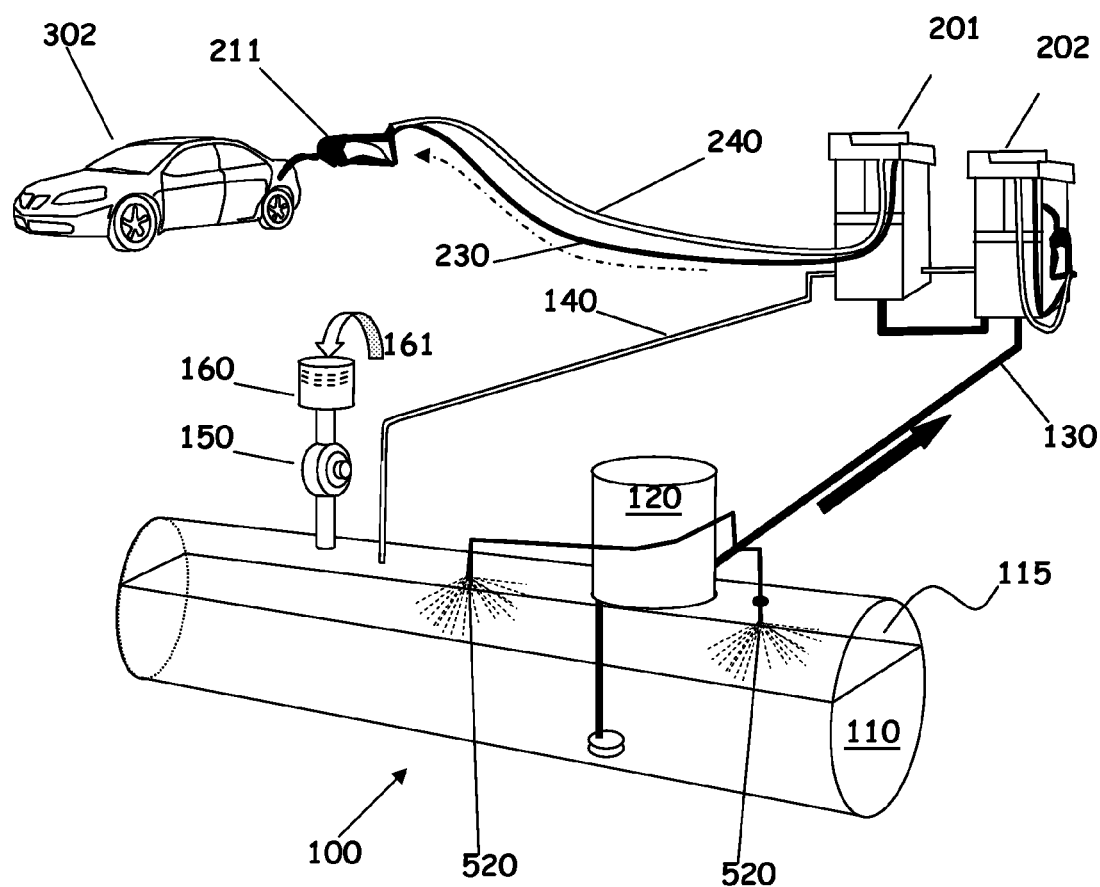
FIG. 10 illustrates additional modes of operation using devices to saturate air in the tank.

FIG. 10 shows additional methods of bringing about equilibrium within tank 100. Liquid fuel may be sprayed into the ullage space 115 from one or more in-tank spray devices 520, for example mounted on the tank ceiling, or extending from the tank wall or floor upward into the ullage space. The liquid fuel may be provided from pump 120 or from another pump (not shown). Unlike the method taught in U.S. Pat. No. 6,763,856, the present invention requires no separate apparatus for conditioning/saturating of the gaseous flow prior to its entering the fuel tank.

Figure 11:
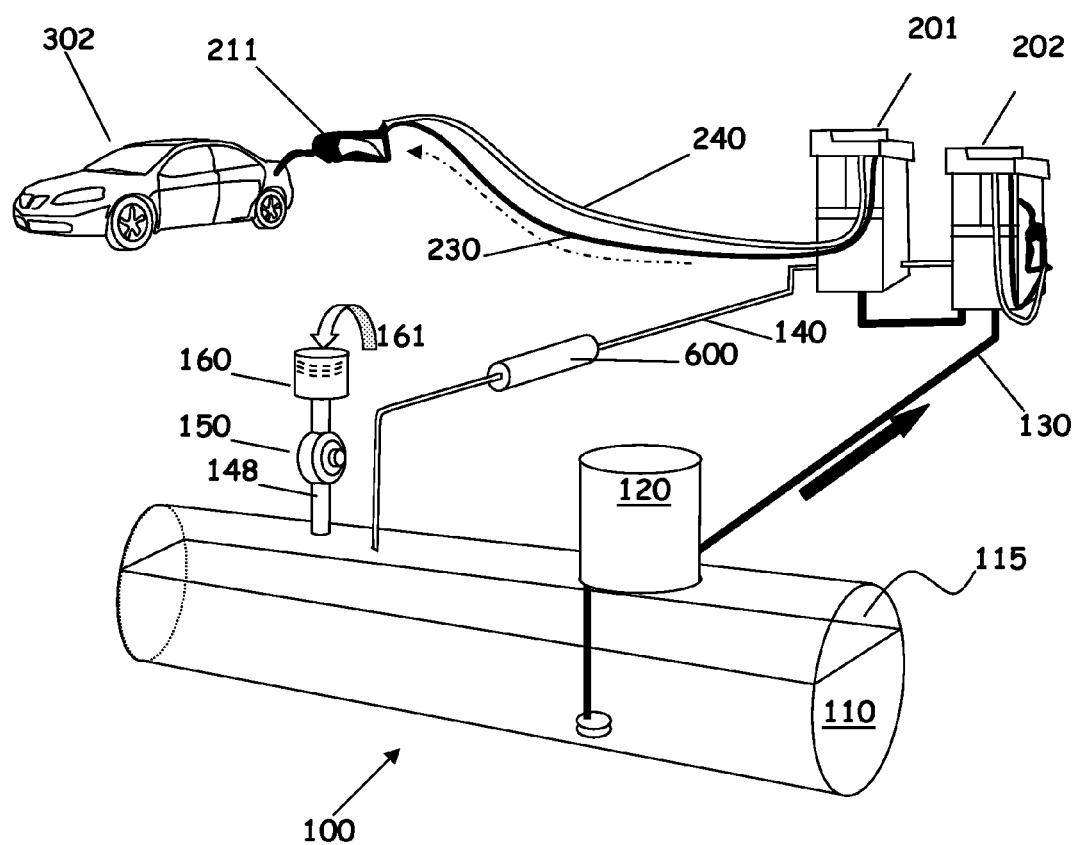
FIG. 11 illustrates an additional mode of operation using a device to saturate air in a tank.
Figure 12:
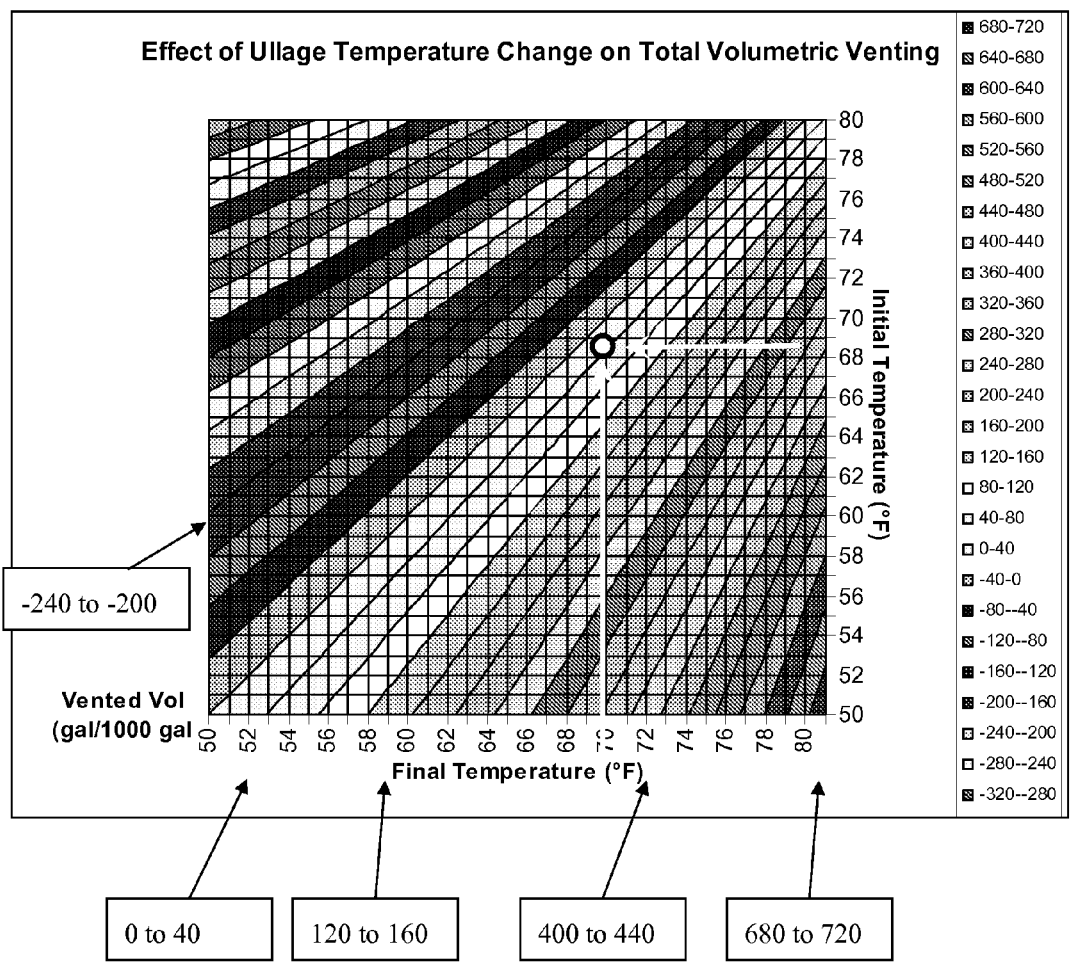
FIGS. 12 and 13 illustrate the effect of temperature on the amounts of vapor/air vented from a tank.
Figure 13:
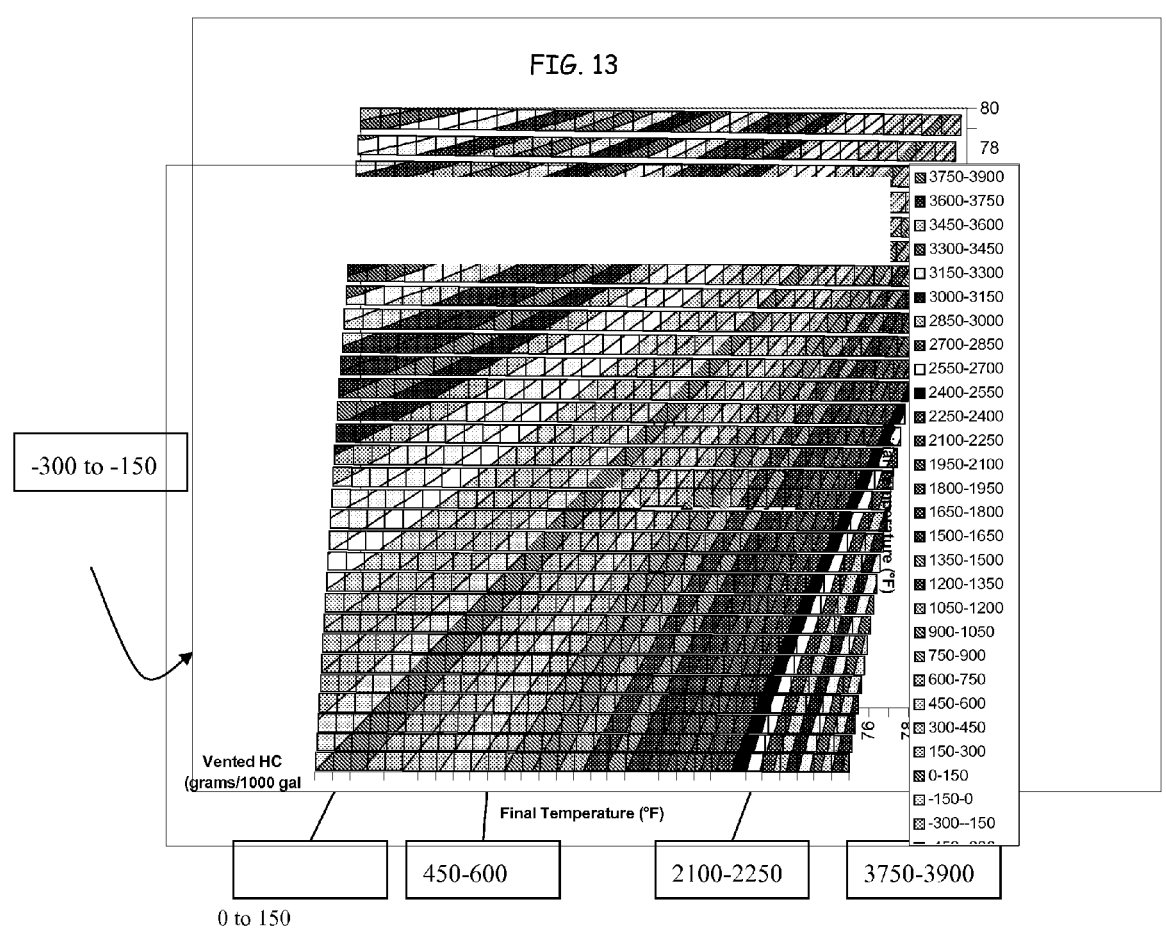

The phase change of gasoline from liquid to vapor phase entails a heat of vaporization. In order to help encourage vaporization so as to more rapidly reach equilibrium, another embodiment of the invention utilizes a heating means to warm vapor or air that is in the ullage space or is entering the ullage space, as shown in FIG. 11. A heater may be utilized in any of the other embodiments as well. Appropriate care should be taken with flammable liquids and gases. A heater could comprise any safe means to provide heat to the liquid phase or the gas phase. Devices and systems for heating tanks directly or indirectly are known in the art. Incoming air, or return air/vapor could be preheated before entering the tank. For example, an air heater 600 with suitable safety precautions may be used on air/vapor return line 140. Vapor growth and potential vapor venting within the storage tank is also due to a rise in vapor temperature that may occur after station shutdown. When ORVR equipped vehicles are refueled in Phase II EVR equipped gas stations, makeup air is required to maintain pressure within the storage tank. This air is fed from the open environment into the tank through the vent line, filler nozzle return hose, or through system leaks. This air may be at a temperature cooler than the liquid gasoline or ground temperature. Moreover, this makeup air is initially devoid of hydrocarbons. The makeup air will strip hydrocarbons from a hydrocarbon loaded canister (if employed) or in the tank in which the air is in intimate contact with. The vaporization of hydrocarbons is an endothermic process and thus requires heat for vapor-liquid equilibrium to be achieved. As hydrocarbons vaporize into the makeup air or ullage space, the temperature of the vapor and air will drop. Many situations may, therefore, be envisioned in which the vapor and air temperature in the ullage space can be at a temperature below that of the liquid gasoline or ground surrounding the tank (including a fuel dump into the tank at a temperature greater than the ullage space vapor and air, evaporative cooling of the ullage space air and vapors, cooler air feeding into the tank as makeup air, etc.). If the liquid or ground are at a higher temperature relative to the ullage vapor and air, the liquid or ground will act as a heat source and will cause the temperature of the vapor and air to subsequently increase during periods of gas station inactivity (while vehicles are being refueled, the tank will be drawing in fresh air that may maintain a subcooled ullage space temperature relative to the liquid fuel or ground temperature). While the station is shutdown and if the temperature of the vapors and air in the tank ullage space are increasing, the system may vent air and hydrocarbons from the tank. The magnitude of the potential air and vapor venting from a tank filled with 14 psi RVP fuel is shown in FIG. 12 (total volume of air plus vapor per 1000 gallons of ullage) and FIG. 13 (total mass of hydrocarbons per 1000 gallons of ullage) as a function of initial ullage space temperature (vapor plus air) versus final ullage space temperature. It is apparent from the data that even a modest temperature increase of the vapors and air in the tank can have a significant effect on emissions. For example, if a tank is filled with 14 psi RVP fuel at 72° F. and is in contact with a vapor space at 70° F. and 100% saturation (55% hydrocarbon by volume in the headspace at the time of station shut down, the temperature of the vapors and air could increase to 72° F. (assuming the liquid is a large enough heat sink such that the temperature of the liquid gasoline is only slightly affected) and maintain 100% saturation. The volumetric concentration of the hydrocarbons would now be at 57.1%. Under this scenario, the potential hydrocarbon venting would be about 305.4 grams/1000 gallons ullage. If the ullage space is heated to a temperature at or greater than 72° F. prior to station shutdown, there would be no significant venting from the tank (if the temperature of the ullage space is greater than 72° F., the ullage space vapors and air would cool, and hydrocarbon condensation would occur in the tank with no venting).

Figure 14:
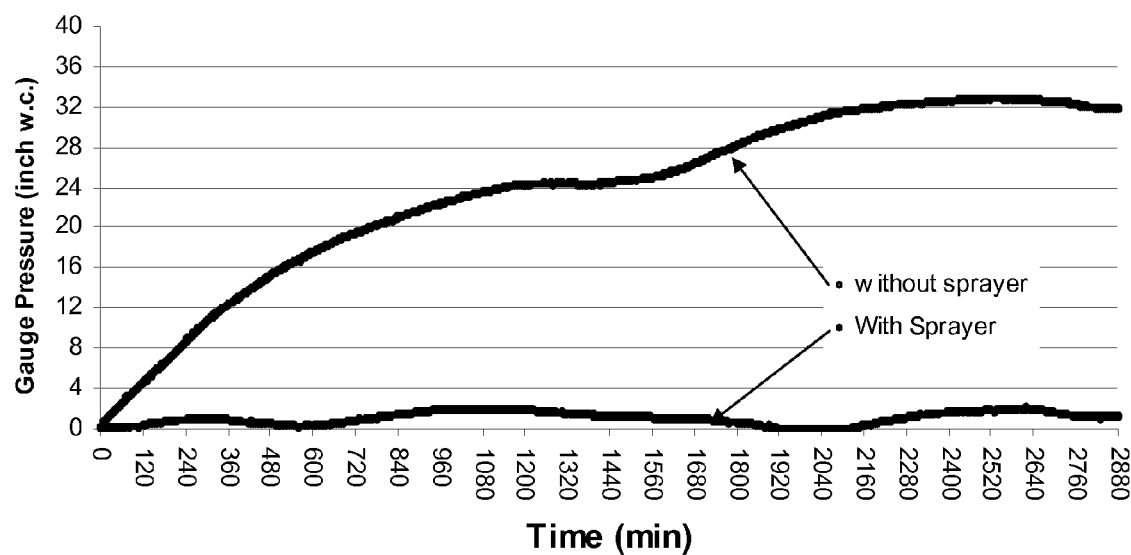
FIG. 14 shows experimental data illustrating the effect of using a spray device within a tank.

Experimental data supports the concept of improving the rate of mass transfer to achieve vapor saturation, and thus reduces vapor growth. An 8 inch diameter column approximately seven feet tall was filled with 9 RVP gasoline. The gasoline was pumped out of the column at 16.2 ml/min and fresh air was allowed to enter the tank. A pump connected to the bottom of the column could be used to circulate gasoline through a spray nozzle located at the inside top of the column. During a first test condition, the sprayer was not operated. During a second test condition, the sprayer was operated. Intimate contact existed between the gasoline spray and the column ullage. For each condition, after sixteen hours of operating the tank, the inlet and outlets ports were closed and the pressure was monitored over a two-day period using a pressure transducer connected to a data recorder. The data are shown in FIG. 14. In the condition without the sprayer in operation, the pressure inside the column reached approximately 32 inches w.c. In the test condition with the sprayer operated, the pressure inside the column only reached 2 inches w.c. The sprayer effectively allowed the air and vapor inside the column to maintain vapor saturation while gasoline was being pumped out.

Figure 1:
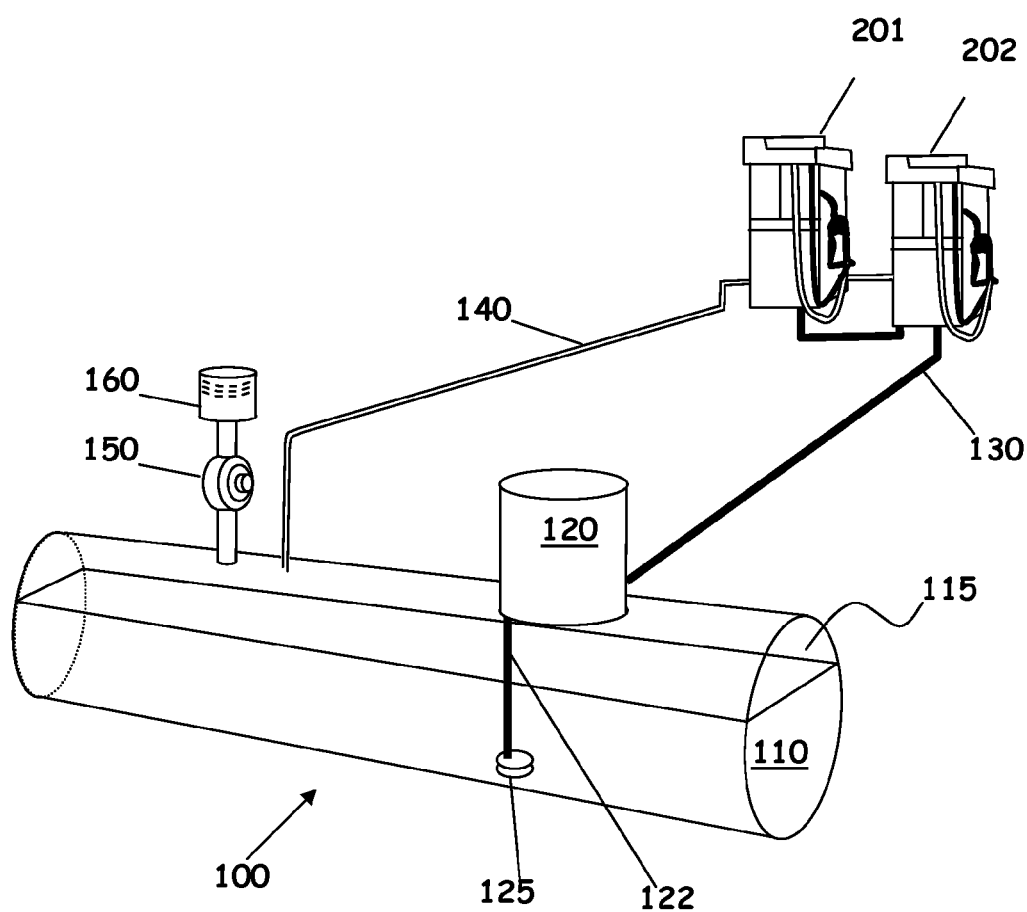
FIG. 1 illustrates a fuel dispensing facility (gas station)
Figure 2:
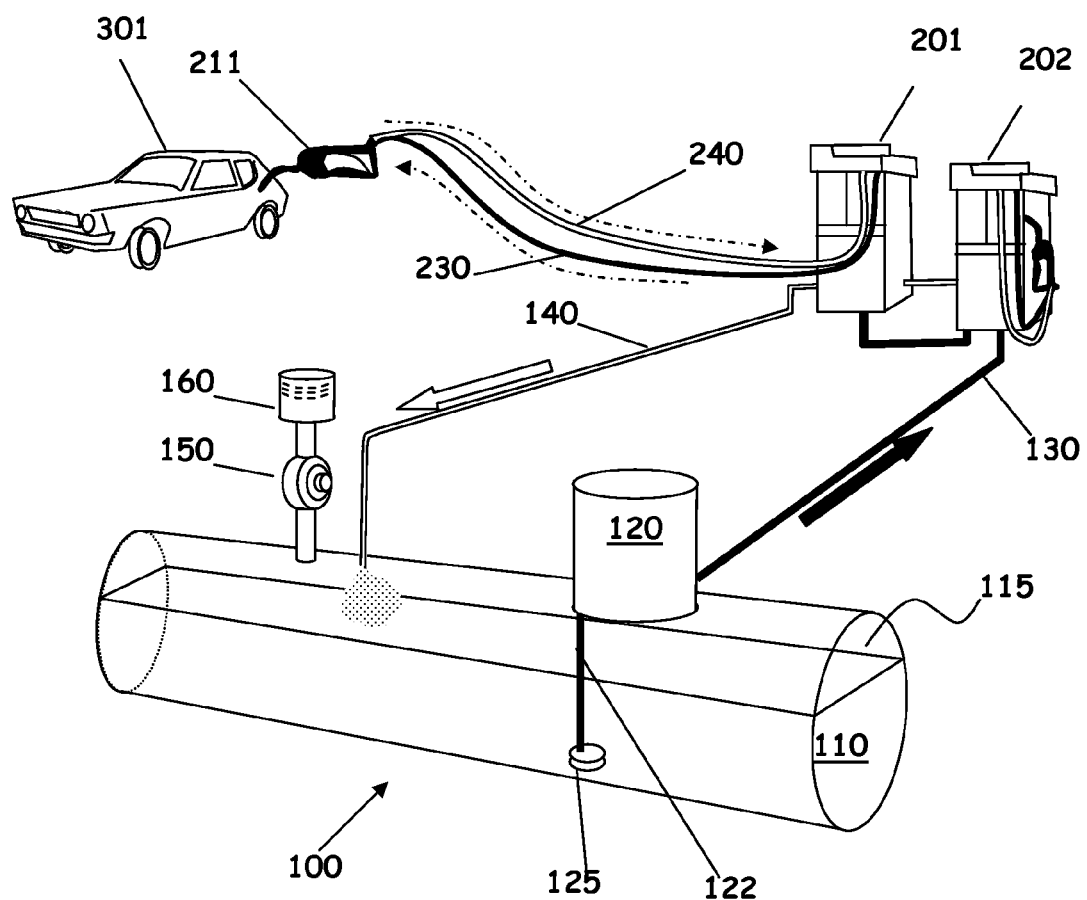
FIG. 2 illustrates a mode of operation while fueling a vehicle that does not have an on-board refueling vapor recovery (ORVR) system.
Figure 3:
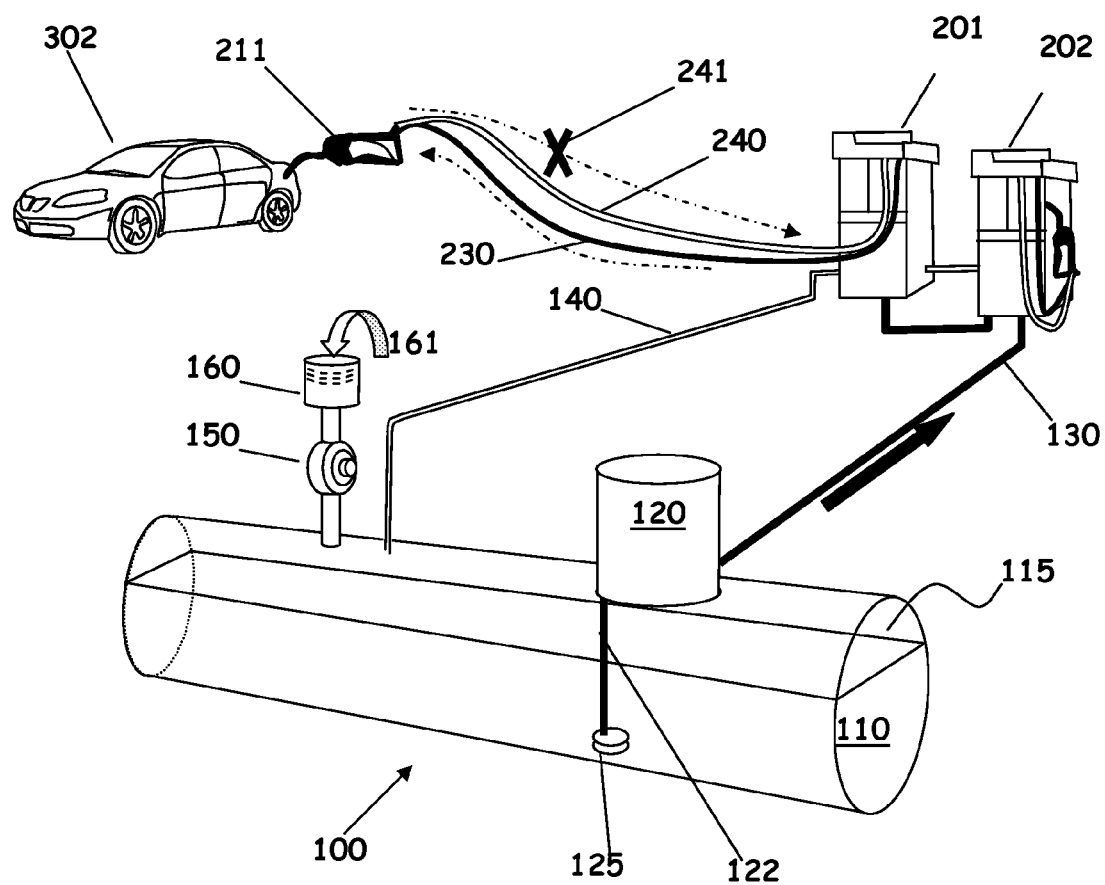
FIG. 3 illustrates a mode of operation while fueling a vehicle that has an on-board refueling vapor recovery (ORVR) system.
Figure 4:
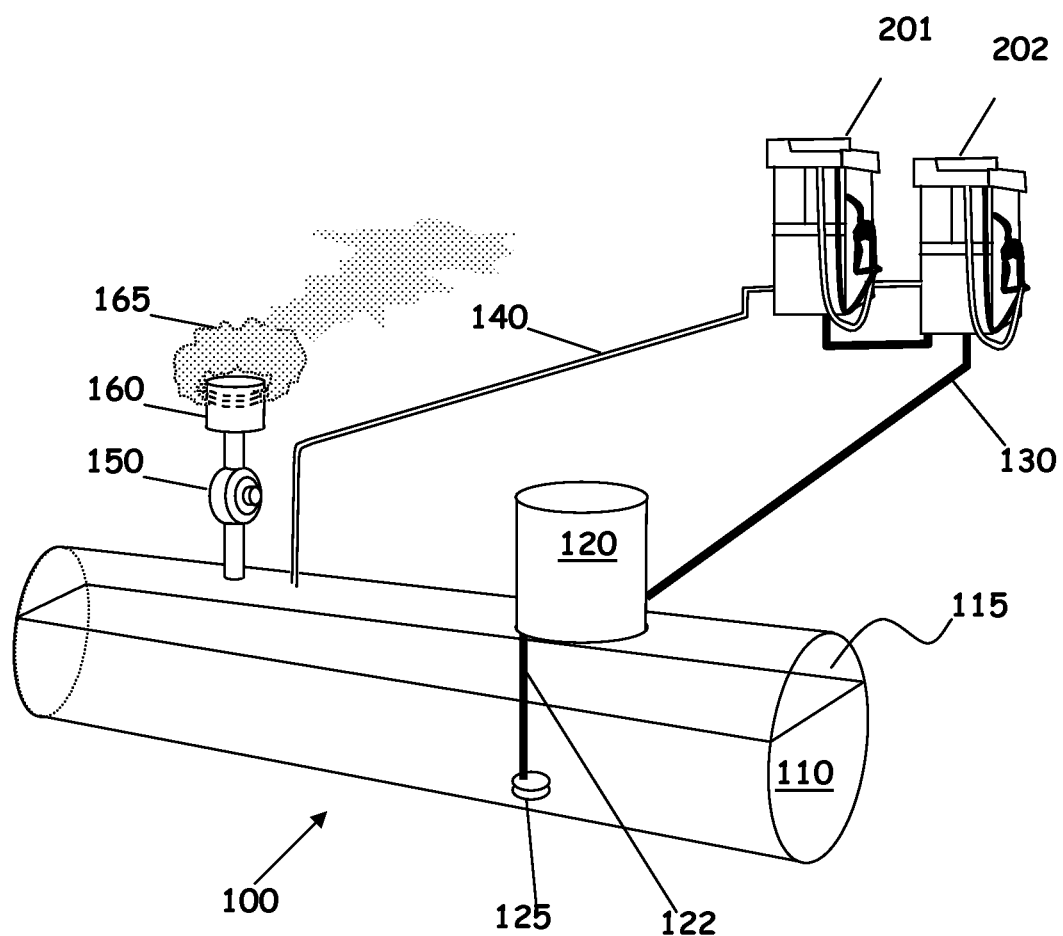
FIG. 4 illustrates a mode of operation when no vehicles are being refueled.

Most gasoline service stations in the United States use submersible turbine pumps (STP). As stated in the description of FIG. 1, the submersible pump 120 previously discussed is shown as a simplified unit. Such a pump typically includes an upper part or head (denoted elsewhere by "pump" 120) that may be located out of the tank 100, for example in an access space. The pump will also typically have submerged within the liquid phase 110 a sump portion 125 that may include a pickup, motor, and pump impeller such as a turbine. Between sump portion 125 and pump head 120 is a pipe 122 through which the pumped liquid may pass. This pipe 122 may have within it a conduit carrying electrical power to the motor. Liquid that is pumped from the sump portion 125 thus moves through pipe 122 to head 120, from whence it may be delivered to pump outlet line 130 to feed the gas dispensers.

Figure 15:
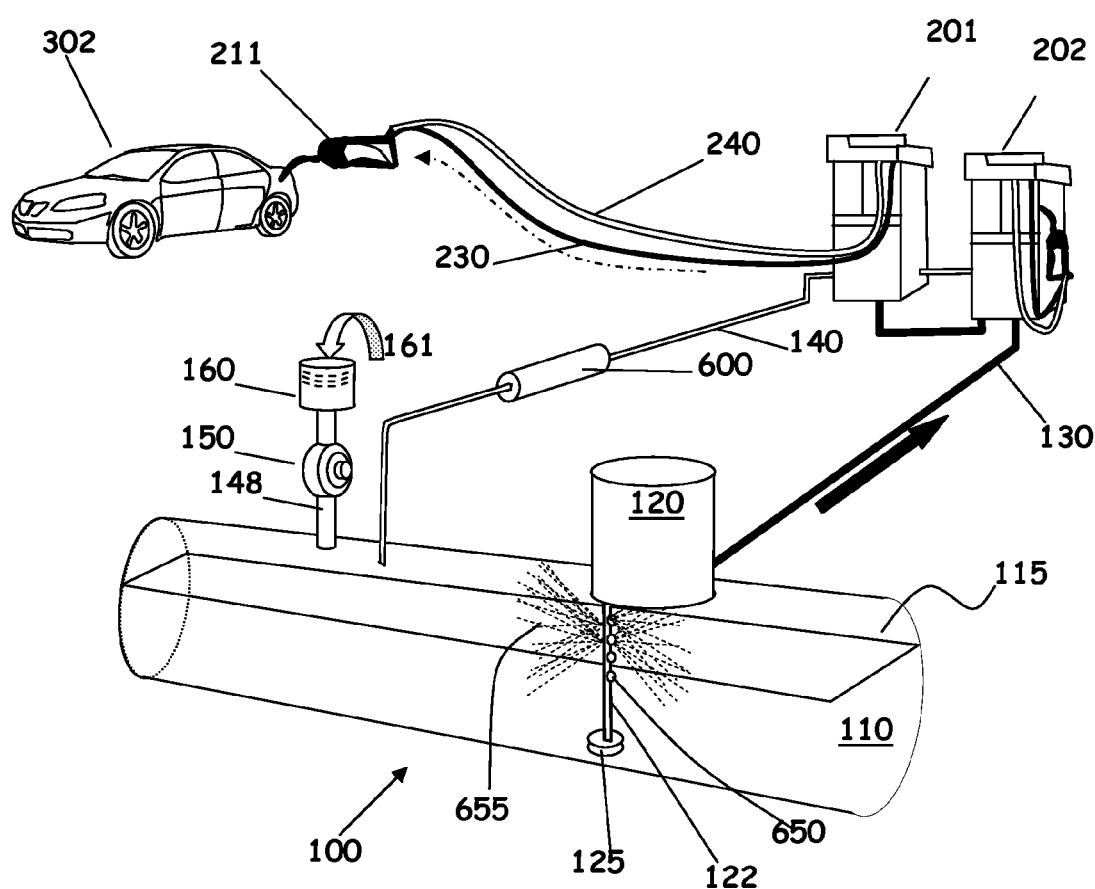
FIG. 15 illustrates an additional mode of operation for saturating the air in or entering a tank.

FIG. 15 shows a method of bringing about equilibrium within tank 100. Certain parts previously shown and described may be used with this method but are not repeated here. In one embodiment, liquid fuel may be sprayed into the ullage space 115 from one or more spray devices 650 located in or on pipe 122. For example, these spray devices 650 may be nozzles, holes in pipe 122, or other devices on or features of pipe 122 that are capable of allowing liquid (for example as spray 655) to pass from pipe 122 into the ullage space 115. The pump used may also serve as or replace the existing pump used to feed gasoline to the gas station fuel dispensers.

A common submersible pump used at gasoline distribution facilities is manufactured by Red Jacket (a Veeder Root company). Such a pump may penetrate the tank through a four inch diameter female threaded bung. While the pump is in operation, the liquid may be at pressures between 10 psig and 70 psig. The pipe that runs between the submersible pump head and the motor/turbine/pickup is generally 1.5-2" diameter. This pipe may be tapped or converted such that sprayer nozzles may be fastened to the pipe. These nozzles may be of many varieties (including without limitation open cone, thin stream, fan spray, hydraulic atomizing, etc.) and any number of nozzles may be added, limited by the length and circumference of the pipe. Besides using nozzles in the pipe, simple holes may also suffice for delivery of gasoline into the vapor space of the tank. An advantage of using the pipe between the sump and the head is that this part may be fairly accessible, for example for maintenance or replacement, and may thus lend itself to retrofitting with nozzles or other vaporizing devices.

When gasoline vaporizes, the temperature of the gasoline and the air into which it vaporizes drops due to the heat of vaporization. If the temperature drops, saturation at the tank temperature will not be achieved, because the saturation concentration drops with temperature. A heater may be used to heat the gasoline prior to delivering it into the vapor space of the tank. By adding heat, gasoline may be vaporized such that the final temperature is equal or greater than the initial temperature.

The vapor/air return line 140 shown in many of the FIGs and discussed in many of the embodiments may not be required in some situations. For example, as the population of vehicles becomes more ORVR vehicles and fewer non-ORVR vehicles, gasoline fueling stations may no longer need the air/vapor return line 140. In such situations, an increased amount of fresh air 161 may enter the storage tank. It should be understood that the invention will still work without the vapor/air line 140, and the vapor/air line is not required in all situations.

Also, when an adsorbent canister is used, its location may be at other locations than those shown in the drawings. For example activated carbon canister 400 of FIG. 6 may be located between PV valve 140 and tank 100.

The pump (such as 120) used to supply fuel to the fuel dispensers 201, 202 may operate only when fuel is being dispensed by the fuel dispensers. Particularly if this pump also is used to feed a device for achieving vapor/liquid equilibrium, a timing means may be incorporated into the system to cause the pump to continue operating for some additional duration in order to provide more time for the ullage space to come to equilibrium. Such an additional duration may be several hours, for example up to eight hours.

An adsorbent canister may still be used in conjunction with any of these systems as a backup vapor control device or to treat pressure spikes that can occur during fuel drops into the storage tank. Nonetheless, the capacity requirement for the adsorbent canister will be reduced for this embodiment. Calculations show that if hydrocarbon vapor concentration levels of 99% can be achieved using a vapor saturator device, a PV valve alone can eliminate vent releases if the vacuum is set at approximately −5 inches w.c. Furthermore, the in-station diagnostics (ISD) requirements may be reduced because, with tank vapor always at or near equilibrium, simply monitoring pressure may suffice as an indication of vent-losses, instead of needing a more complex system for hydrocarbon emissions monitoring.

Methods of making and using the emission control system in accordance with the invention should be readily apparent from the mere description of the structure and its varied appearances as provided herein. No further discussion or illustration of such methods, therefore, is deemed necessary.

Although the examples are provided with particular exemplary piping arrangements and in some cases a particular order in which components are connected together, other piping and connection arrangements and may be utilized as well.

It is to be understood that the foregoing description relates to embodiments are exemplary and explanatory only and are not restrictive of the invention. Any changes and modifications may be made therein as will be apparent to those skilled in the art. Such variations are to be considered within the scope of the invention as defined in the following claims.

What is claimed is:

1. A vapor recovery system for a fuel dispensing facility, the system including:
   at least one fuel tank having ullage space;
   at least one fuel outlet line from the fuel tank to a fuel dispenser;
   at least one return line from the fuel dispenser to the fuel tank; and
   at least one vaporizing device resided within the fuel tank to add fuel into the ullage space for enhancing an equilibrium of fuel vapor and air in the ullage space, wherein the at least one vaporizing device comprises at least one hole in a pickup line between an intake and a head of a submersible pump, the submersible pump configured to draw the fuel from the fuel tank into the fuel dispenser.

2. The system of claim 1, further comprising at least one canister comprising adsorbent.

3. The system of claim 2, wherein the adsorbent comprises at least one structure selected from the group consisting of granular, pelletized, fibrous, honeycomb, and combinations thereof.

4. The system of claim 2, wherein the adsorbent comprises at least one member selected from the group consisting of activated carbon, zeolite, activated alumina, silica, and combinations thereof.

5. The system of claim 4, wherein a precursor of the activated carbon comprises at least one material selected from the group consisting of wood, peat, coal, coconut, lignite, petroleum pitch, petroleum coke, coal tar pitch, fruit pits, nut shells, sawdust, wood flour, synthetic polymer, natural polymer, and combinations thereof.

6. The system of claim 2, wherein the adsorbent is pelletized activated carbon having a butane working capacity of greater than 5 g/100 ml, a butane ratio of greater that 50%, and a density of greater than 0.2 g/cc.

7. The system of claim 2, wherein the adsorbent is pelletized activated carbon having a butane working capacity of greater than 10 g/100 ml, a butane ratio of greater that 75%, and a density of greater than 0.24 g/cc.

8. The system of claim 2, wherein the adsorbent is pelletized activated carbon having a butane working capacity of greater than 11 g/100 ml, a butane ratio of greater that 85%, and a density of greater than 0.26 g/cc, is used as adsorbent.

9. The system of claim 2, wherein the canister has a cylindrical shape with a ratio of length to diameter of at least two.

10. The system of claim 2, wherein the canister has a non-cylindrical or complex shape with a ratio of cross-sectional area to length of at least 0.2.

11. The system of claim 1, further including a heating means positioned on the at least one return line from the fuel dispenser the fuel tank to enhance equilibrium of fuel vapor and air in the ullage space.

12. The system of claim 11, comprising at least one air passage line between the fuel tank and an atmosphere.

13. The system of claim 11, wherein the heating means comprises at least one heater for heating vapor or air entering the ullage space.

14. The system of 11, wherein the heating means comprises at least one heater for heating vapor or air inside the ullage space.

15. A vapor recovery system for a fuel dispensing facility, the system including:
- at least one fuel tank having ullage space;
- at least one fuel outlet line from the fuel tank to a fuel dispenser;
- at least one return line from the fuel dispenser to the fuel tank; and
- at least one vaporizing device resided within the fuel tank to add fuel into the ullage space for enhancing an equilibrium of fuel vapor and air in the ullage space, wherein the at least one vaporizing device comprises at least one nozzle attached to a pickup line between an intake and a head of a submersible pump and located within the volume of the fuel tank, the submersible pump configured to draw the fuel from the fuel tank into the fuel dispenser.

16. A vapor recovery system for a fuel dispensing facility, the system including:
- at least one fuel storage tank having ullage space;
- a first pump connected to at least one fuel outlet line from the fuel storage tank to a fuel dispenser;
- at least one fuel return line from the fuel dispenser to the fuel storage tank; and
- at least a second pump connecting a first passage line to a second passage line, wherein:
- the first passage line is opened to the ullage space inside the fuel storage tank,
- the second passage line is emerged in a fuel-filled portion inside the fuel storage tank, and the second pump draws gaseous component from the ullage space of the fuel storage tank into the fuel-filled portion of the fuel storage tank.

17. A vapor recovery system for a fuel dispensing facility, the system including:
- at least one fuel storage tank comprising ullage space;
- at least one fuel outlet line from the fuel storage tank to a fuel dispensing station;
- at least one fuel return line from the fuel dispensing station to the fuel storage tank;
- a submersible pump connected to the at least one fuel outlet line from the fuel storage tank to the fuel dispensing station, the submersible pump configured to draw the fuel from the fuel storage tank into the fuel dispensing station; and
- at least one vaporizing device positioned on a pickup line between an inlet and a head of the submersible pump.

* * * * *